(12) United States Patent
Grube et al.

(10) Patent No.: US 10,169,146 B2
(45) Date of Patent: Jan. 1, 2019

(54) REPRODUCING DATA FROM OBFUSCATED DATA RETRIEVED FROM A DISPERSED STORAGE NETWORK

(71) Applicant: International Business Machines Corporation, Armonk, NY (US)

(72) Inventors: Gary W. Grube, Barrington Hills, IL (US); Timothy W. Markison, Mesa, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 15/131,488

(22) Filed: Apr. 18, 2016

(65) Prior Publication Data

US 2016/0232056 A1    Aug. 11, 2016

Related U.S. Application Data

(63) Continuation of application No. 13/309,469, filed on Dec. 1, 2011, now Pat. No. 9,319,463.

(60) Provisional application No. 61/427,457, filed on Dec. 27, 2010.

(51) Int. Cl.
| | |
|---|---|
| *G06F 11/10* | (2006.01) |
| *G06F 21/62* | (2013.01) |
| *G06F 21/64* | (2013.01) |
| *H04L 29/08* | (2006.01) |
| *G06F 3/06* | (2006.01) |

(52) U.S. Cl.
CPC .......... *G06F 11/1076* (2013.01); *G06F 3/064* (2013.01); *G06F 3/067* (2013.01); *G06F 3/0619* (2013.01); *G06F 21/62* (2013.01); *G06F 21/64* (2013.01); *H04L 67/1097* (2013.01); *G06F 3/062* (2013.01)

(58) Field of Classification Search
CPC .......... G06F 17/30; G06F 3/062; G06F 21/62; G06F 21/10; H04L 67/10
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Hadi S Armouche
*Assistant Examiner* — Paul E Callahan
(74) *Attorney, Agent, or Firm* — Garlick & Markison; Timothy W. Markison; Kelly H. Hale

(57) ABSTRACT

A method includes first encoding first data into a first plurality of sets of encoded data slices, wherein the first encoding is in accordance with a first dispersed error encoding function. The method further includes second encoding second data into a second plurality of sets of encoded data slices, wherein the second encoding is in accordance with a second dispersed error encoding function. The method further includes creating a plurality of mixed sets of encoded data slices from the first and second plurality of sets of encoded data slices in accordance with a mixing pattern. The method further includes outputting the plurality of sets of mixed encoded data slices to storage units of the DSN for storage therein.

20 Claims, 20 Drawing Sheets

(56) References Cited

U.S. PATENT DOCUMENTS

| | | | |
|---|---|---|---|
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,504,847 B2 | 8/2013 | Resch et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0115335 A1 | 5/2010 | Wylie et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Narking Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

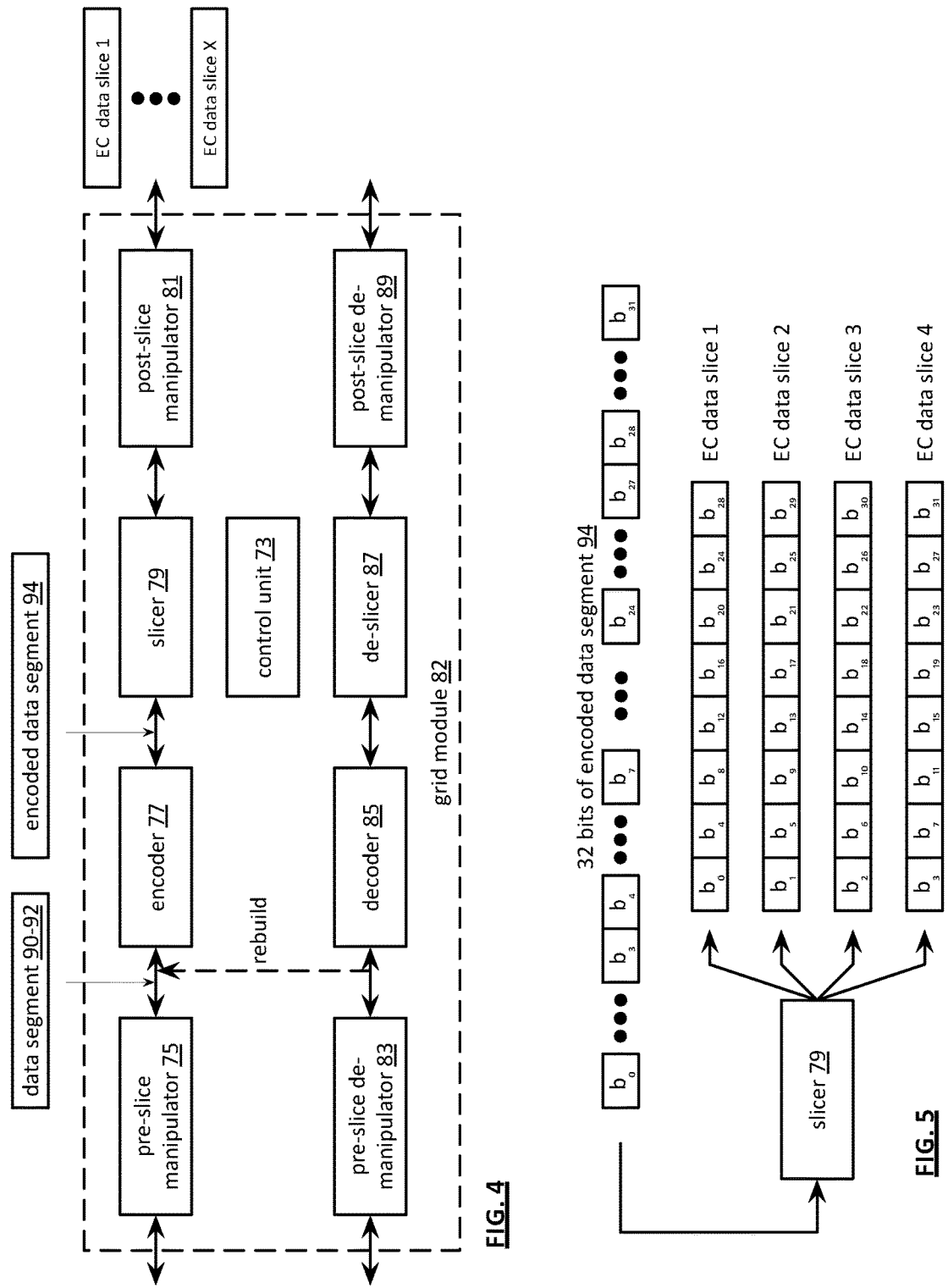

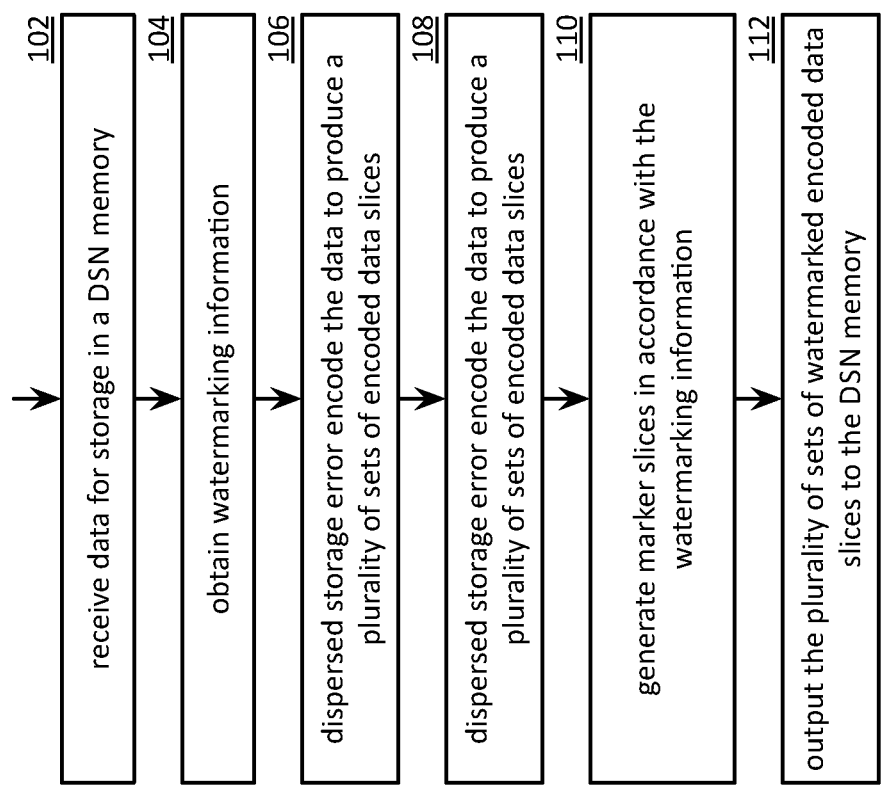

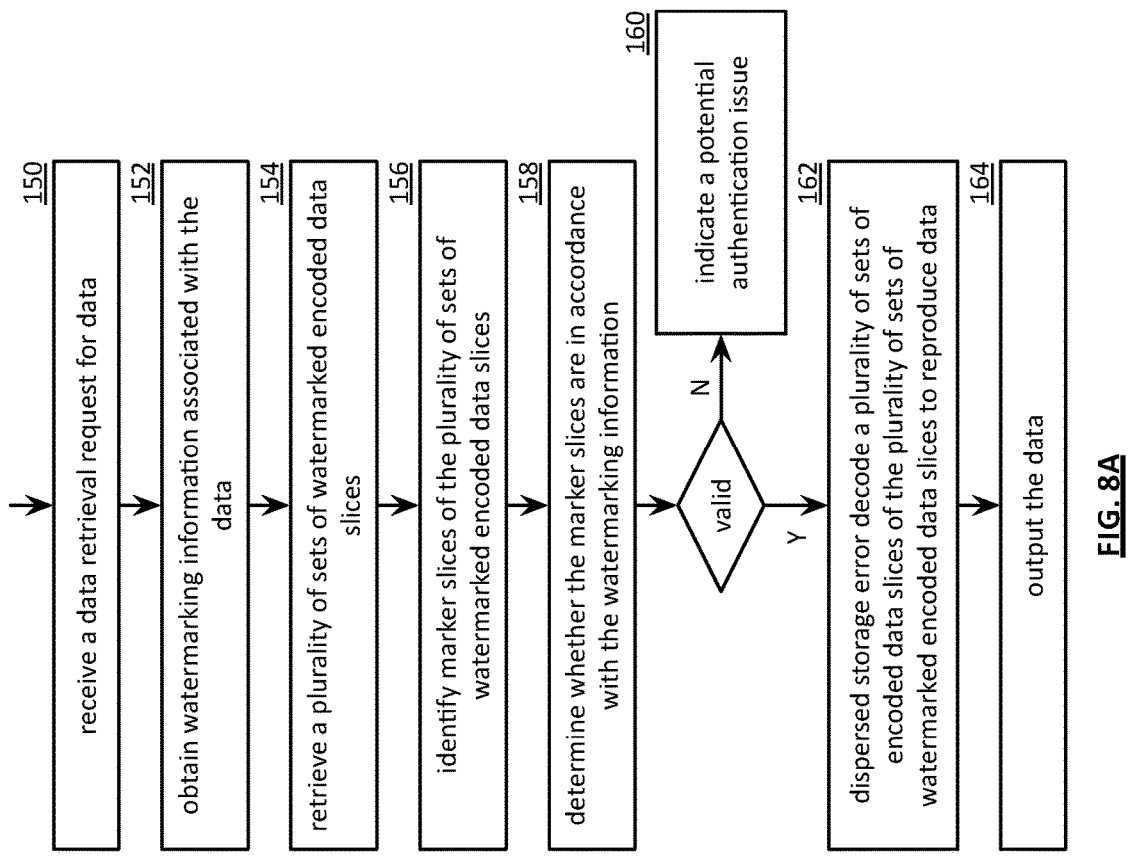

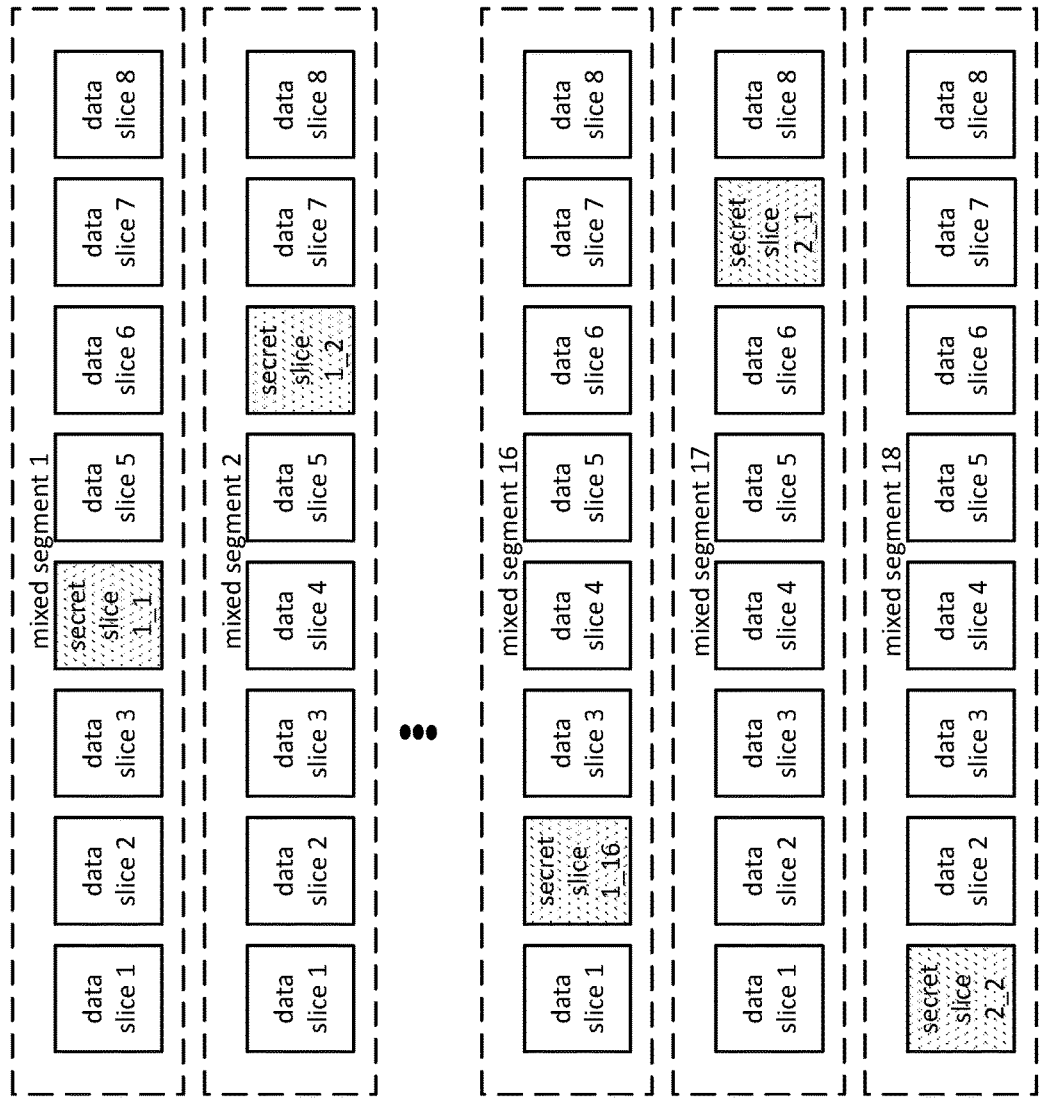

REPRODUCING DATA FROM OBFUSCATED DATA RETRIEVED FROM A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 13/309,469, entitled "REPRODUCING DATA FROM OBFUSCATED DATA RETRIEVED FROM A DISPERSED STORAGE NETWORK", filed Dec. 1, 2011, issuing as U.S. Pat. No. 9,319,463 on Apr. 19, 2016, which claims priority pursuant to 35 U.S.C. § 119(e) to U.S. Provisional Application No. 61/427,457, entitled "STORING SECRET DATA IN A DISPERSED STORAGE NETWORK", filed Dec. 27, 2010, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc., are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 7A is a flowchart illustrating an example of watermarking sets of encoded data slices in accordance with the invention;

FIG. 8A is a flowchart illustrating an example of validating sets of watermarked encoded data slices in accordance with the invention;

FIG. 11C is a diagram illustrating another example of a plurality of sets of encoded mixed slices in accordance with the invention;

DETAILED DESCRIPTION OF THE INVENTION

Figure 1:
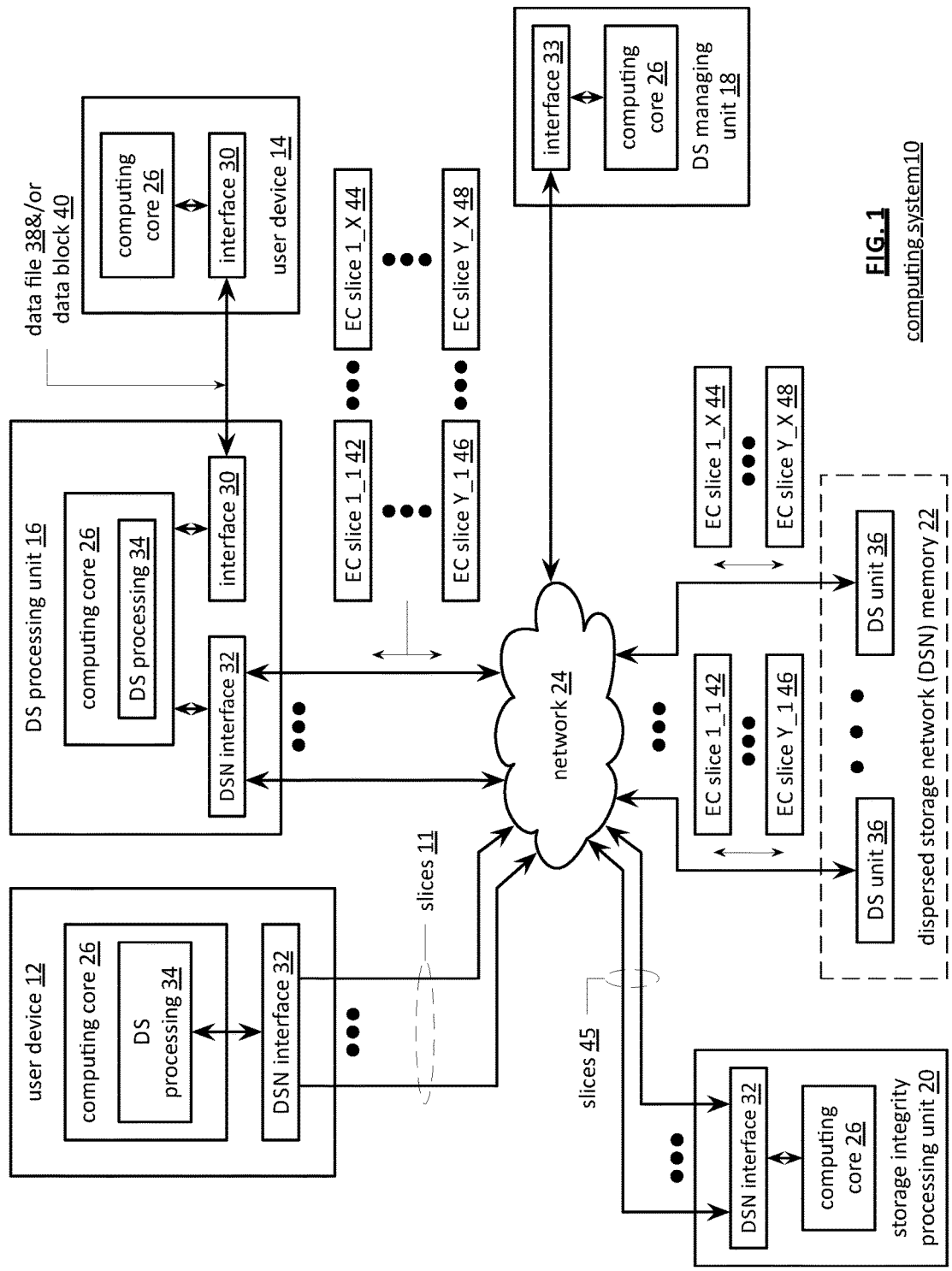
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
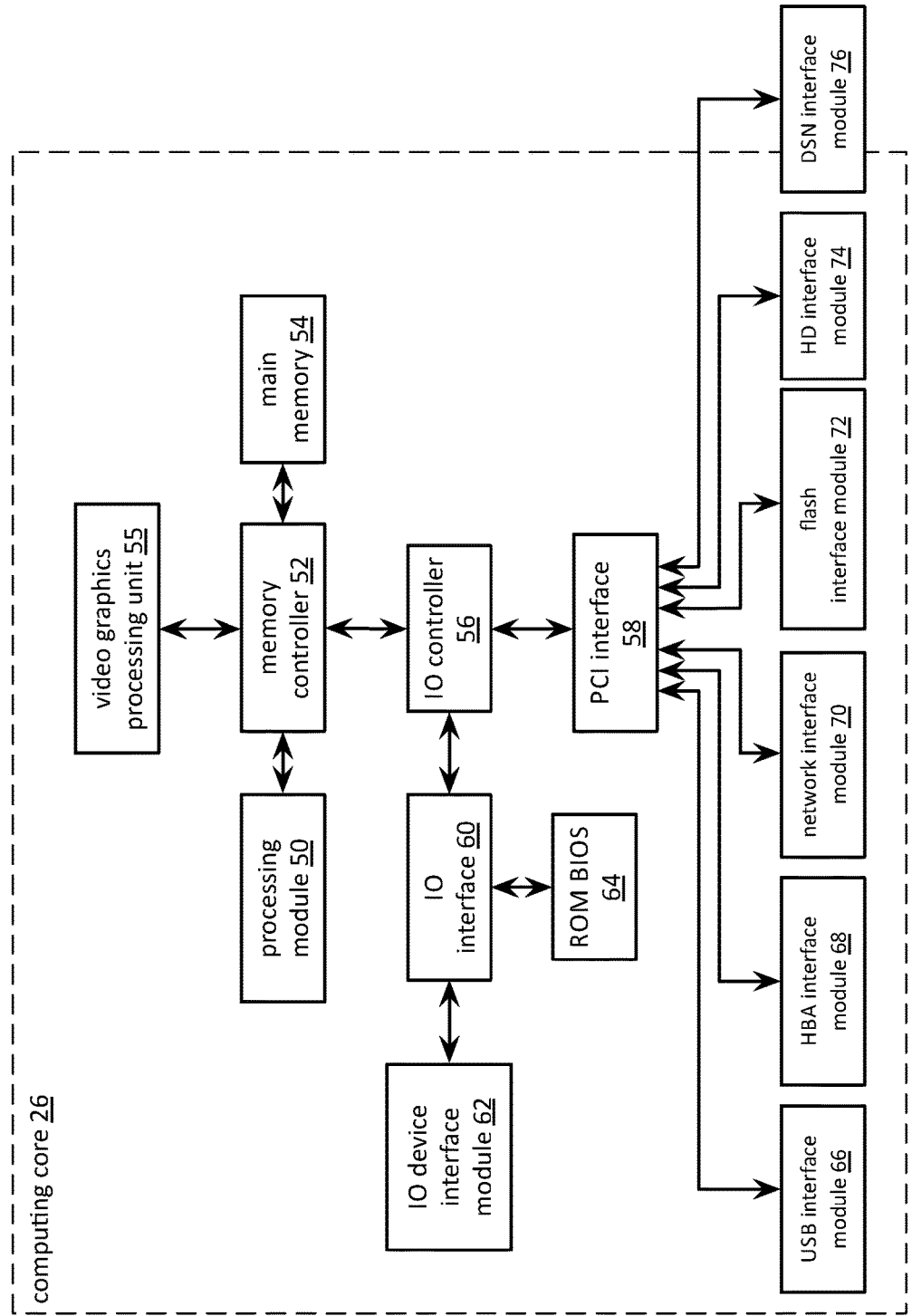
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
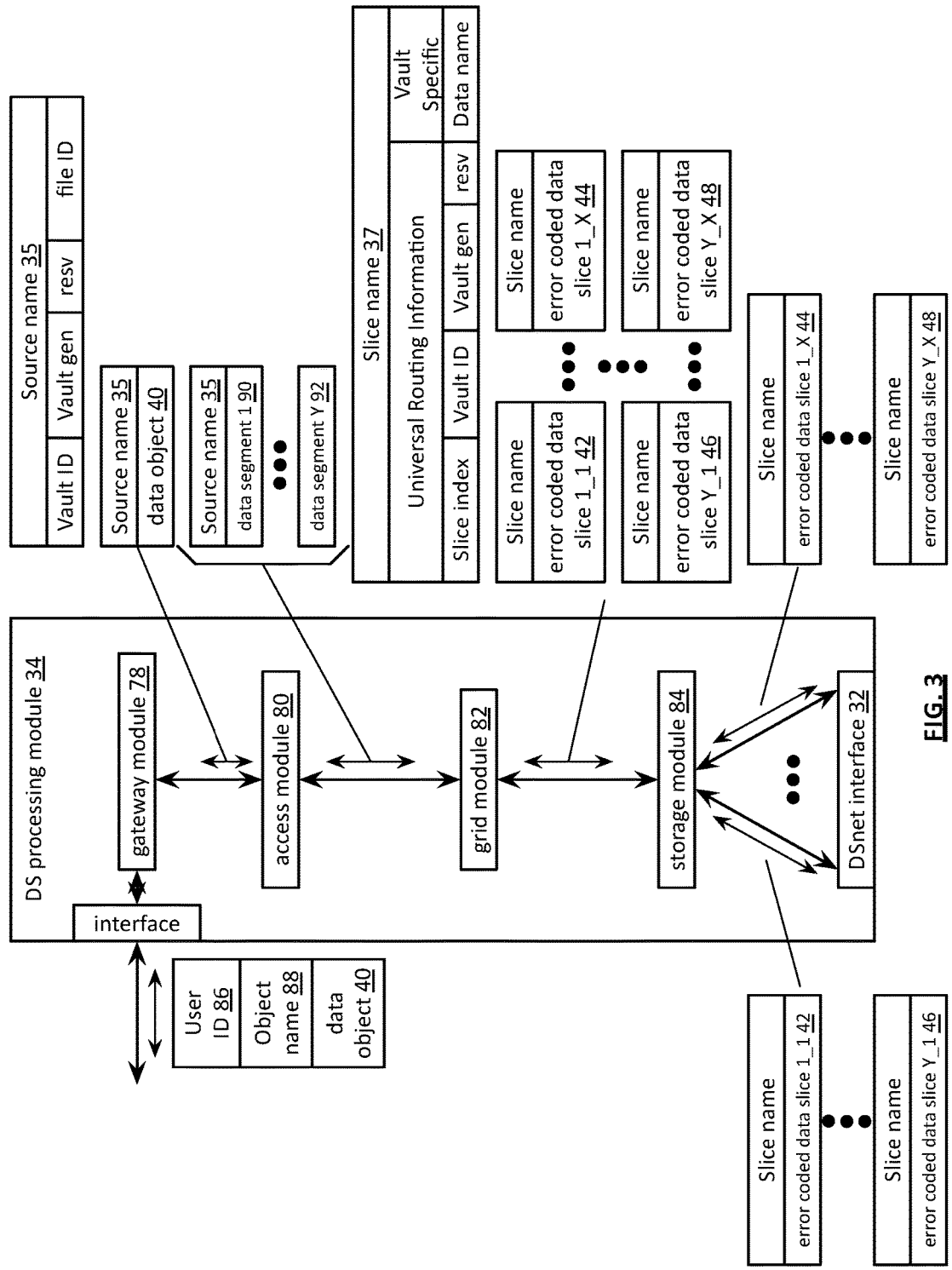
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-48.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
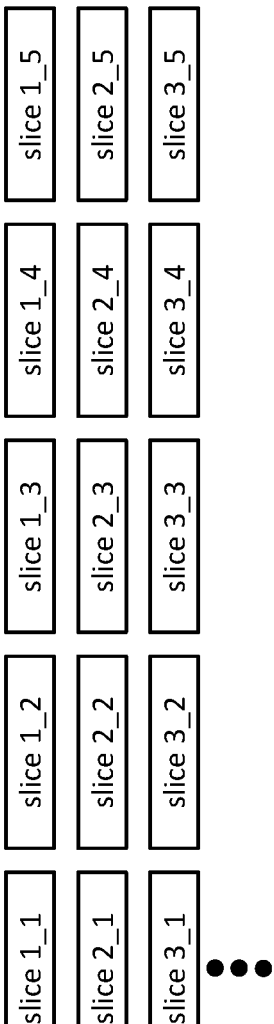
FIG. 6A is a diagram illustrating an example of a plurality of sets of slices in accordance with the invention.
Figure 6B:
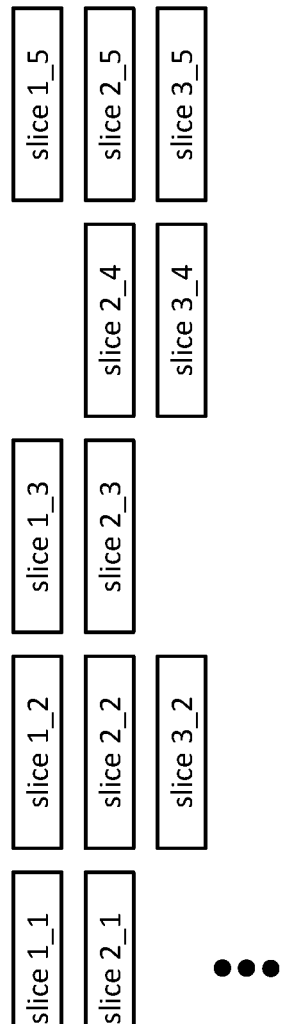
FIG. 6B is a diagram illustrating an example of a plurality of subsets of slices in accordance with the invention.
Figure 6C:
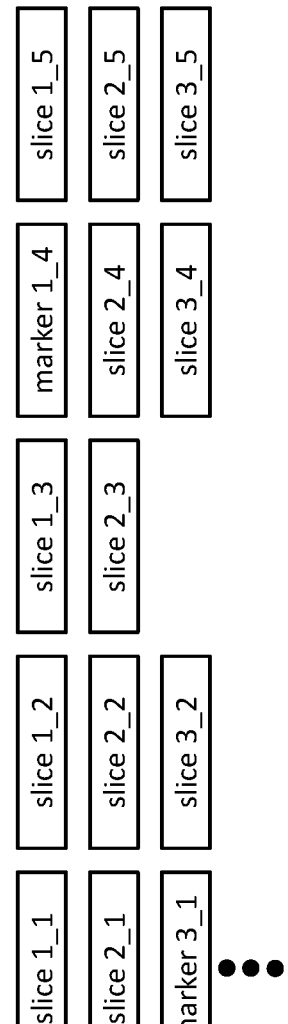
FIG. 6C is a diagram illustrating an example of a plurality of watermarked slices in accordance with the invention.

FIGS. 6A-6C illustrate three steps to produce a plurality of watermarked encoded data slices, wherein FIG. 6A illustrates producing an initial plurality of sets of encoded data slices to be watermarked, FIG. 6B illustrates selecting slices for substitution of the initial plurality of sets of encoded data slices, and FIG. 6C illustrates inclusion of marker slices in place of the slices for substitution to produce the plurality of watermarked encoded data slices. The method to produce the plurality of watermarked encoded data slices is discussed in greater detail with reference to FIG. 7A and the method to validate the plurality of watermarked encoded data slices is discussed in greater detail with reference to FIG. 8A.

FIG. 6A is a diagram illustrating an example of a plurality of sets of slices, wherein each row correspond to a set of slices and each column corresponds to a pillar associated with each set of slices. Data is divided into a plurality of segments, wherein each segment of the plurality of segments is dispersed storage error encoded to produce a set of slices of the plurality of sets of slices. A number of sets (e.g., segments) is based on a size of the data and error coding dispersal storage function parameters (e.g., data segment size). For example, data is dispersed storage error encoded to produce a plurality of sets of slices corresponding to a plurality of data segments, wherein each set of slices includes five pillars when a pillar width is five. For instance, the data is dispersed storage error encoded to produce a first set of five slices that includes slice 1_1 through slice 1_5, a second set of five slices that includes slice 2_1 through slice 2_5, a third set of five slices that includes slice 3_1 through slice 3_5, etc.

The data is dispersed storage error encoded to produce the plurality of sets of slices in accordance with error coding dispersed storage function parameters, wherein such parameters include a pillar width and a decode threshold. For example, data is dispersed storage error encoded to produce a plurality of sets of five slices per set, wherein at least three slices per set of five slices are required to decode the plurality of sets of slices to reproduce the data when a decode threshold is three and a pillar width is five. Each set of slices is decodable when any (pillar width-decode threshold) number of slices are missing and/or corrupt. For example, slice set 2 is decodable when slices 2_4 and 2_5 are not available and slices 2_1, 2_2, and 2_3 are available when the pillar width is five and the decode threshold is three. As another example, slice set 3 is decodable when slices 3_1 and 3_3 are not available and slices 3_2, 3_4, and 3_5 are available when the pillar width is five and the decode threshold is three.

FIG. 6B is a diagram illustrating an example of a plurality of subsets of slices, wherein 0 to (pillar width-decode threshold) number of slices per set of slices as described with reference to FIG. 6A are selected for exclusion and/or replacement in accordance with watermarking information producing the plurality of subsets of slices (e.g., remaining after the exclusion or replacement). The watermarking information includes one or more of watermarking requirements, a watermarking method, and error coding dispersal storage function parameters. The watermarking method includes one or more of the deleting slices, replacing slices, choosing no pillars for deleting/replacing for a given set of slices, choosing one or more fixed pillars for deleting/replacing, choosing one or more pillars per set of slices for deleting/replacing in accordance with a pseudorandom sequence, and choosing one or more pillars per set of slices for deleting/replacing in accordance with a predetermined pattern and the set of slices. For example, slices 1_4, 3_2, and 3_3 are selected for exclusion from a plurality of sets of slices when the watermarking information includes the watermarking method of choosing one or more pillars per set of slices for deleting/replacing in accordance with the pseudorandom sequence.

Alternatively, data is dispersed storage error encoded to produce the plurality of subsets of slices directly in accordance with error coding dispersal storage function parameters, wherein error coding dispersal storage function parameters includes a plurality of unique encoding matrices corresponding to each set of slices. For example, the data is dispersed storage error encoded to produce a plurality of sets of encoded data slices wherein at least one set of encoded data slices is missing when the error coding dispersal storage function parameters includes an encoding matrix with zero entries in at least one row. For instance, the data is dispersed storage or encoded to produce a first set of slices wherein a slice corresponding to a 4 pillar is missing, a second set of slices that includes slices corresponding to pillars 1-5, and a third set of slices that includes slices corresponding to pillars 2, 4, and 5.

FIG. 6C is a diagram illustrating an example of a plurality of watermarked slices, wherein 0 to (pillar width-decode threshold) number of slices per set of slices as described with reference to FIG. 6B are selected for replacement with a marker slice in accordance with watermarking information producing the plurality of watermarked slices. The marker slice may include all zeroes, all ones, a fixed pattern that is not all ones or all zeroes, a varying pattern from set to set in accordance with the watermarking information, an encrypted variable, an encrypted constant, and a pseudorandom pattern. For example, slice 1_4 is replaced with marker slice 1_4 and slice 3_1 is replaced with marker slice 3_1 in accordance with the watermarking information to produce the plurality of watermarked slices. Slice 3_3 is not replaced with a marker slice nor is slice 3_3 included in the plurality of watermarked slices since slice 3_3 was selected for deletion to indicate watermarking.

FIG. 7A is a flowchart illustrating an example of watermarking sets of encoded data slices. The method begins with step 102 where a processing module (e.g., of a dispersed storage processing unit) receives data for storage in a dispersed storage network (DSN) memory. Alternatively, the processing module receives the data for communicating to a receiving entity. The data may include one or more of a data segment, an encoded data slice, a data object, a data block, and a data file. The receiving may include receiving one or more of the data, a data identifier (ID), a vault ID, a user ID, a user device ID, a file name, a block ID, a source name, a vault source name, a slice name, watermarking information, and a data segment ID.

The method continues at step 104 where the processing module obtains watermarking information regarding a source of the data. The source of the data includes one or more of a user identifier (ID), a user device ID, a DS processing unit ID, a DS unit ID, a DS managing unit ID, a server ID, and a group ID. The obtaining includes one or more of receiving the watermarking information with the data, initiating a query, performing a lookup, and determining based on one or more of a system performance level and a security requirement level. For example, the processing module obtains the watermarking information based on a registry vault lookup corresponding to a vault ID of 457.

The method continues at step 106 where the processing module dispersed storage error encodes the data to produce a plurality of sets of encoded data slices. The dispersed storage error encoding the data further includes error encoding the data in accordance with the watermarking information, wherein the watermarking information includes at least one of a watermarking pattern indicator (e.g., delete slices, replace slices, fixed pillars, pseudorandom pillars), error coding dispersal storage function parameters (e.g., pillar width, write threshold, read threshold, decode threshold), and one or more error coding generator matrixes (e.g., to directly generate sets of slices where some slices are missing). The plurality of sets of encoded data slices may include zero to a pillar width less a decode threshold number (e.g., n-k) of missing slices per set (e.g., produced by one of encoding a full pillar width number of encoded data slices and then deleting 0 to n-k slices per set; and utilizing a special encoding matrix for each set such that that 0 to n-k slices per set are not produced). For example, the processing module dispersed storage error encodes the data in accordance with an error coding generator matrix of the one or more error coding generator matrixes to produce the plurality of sets of encoded data slices. As another example, the processing module dispersed storage error encodes the data in accordance with the error coding dispersal storage function parameters to produce the plurality of sets of encoded data slices.

The method continues at step 108 where the processing module generates marker slices in accordance with the watermarking information by accessing a marker slice list of a plurality of marker slices to retrieve the marker slices or generating marker slices in accordance with the watermarking information by retrieving watermarking data and watermarking error coding dispersal storage parameters and error encoding the watermark data based on the watermarking error coding dispersal storage parameters to produce the marker slices. The marker slices includes at least one of an all zeros slice pattern, an all ones slice pattern, a fixed slice pattern, a varying slice pattern, and a pseudorandom slice pattern. The processing module may generate 0 to a pillar width less a decode threshold number (e.g., n-k) of marker slices per set of encoded data slices.

The method continues at step 110 where the processing module processes the plurality of sets of encoded data slices and the marker slices to produce a plurality of sets of watermarked encoded data slices to have a pattern of encoded data slices and the marker slices in accordance with the watermarking information. The processing module may process the plurality of sets of encoded data slices and marker slices by replacing encoded data slices of the plurality of sets of encoded data slices with marker slices in accordance with the watermarking pattern indicator to produce the plurality of sets of watermarked encoded data slices.

Alternatively, or in addition to, a processing module may process the plurality of sets of encoded data slices and marker slices by inserting marker slices into gaps of the plurality of sets of encoded data slices in accordance with the watermarking pattern indicator to produce the plurality of sets of watermarked encoded data slices. The method continues at step 112 where the processing module outputs the plurality of sets of watermarked encoded data slices to the DSN memory for storage therein. Alternatively, the processing module outputs the plurality of sets of watermarked encoded data slices to a receiving entity (e.g., transmitting the slices via a network).

Figure 7B:
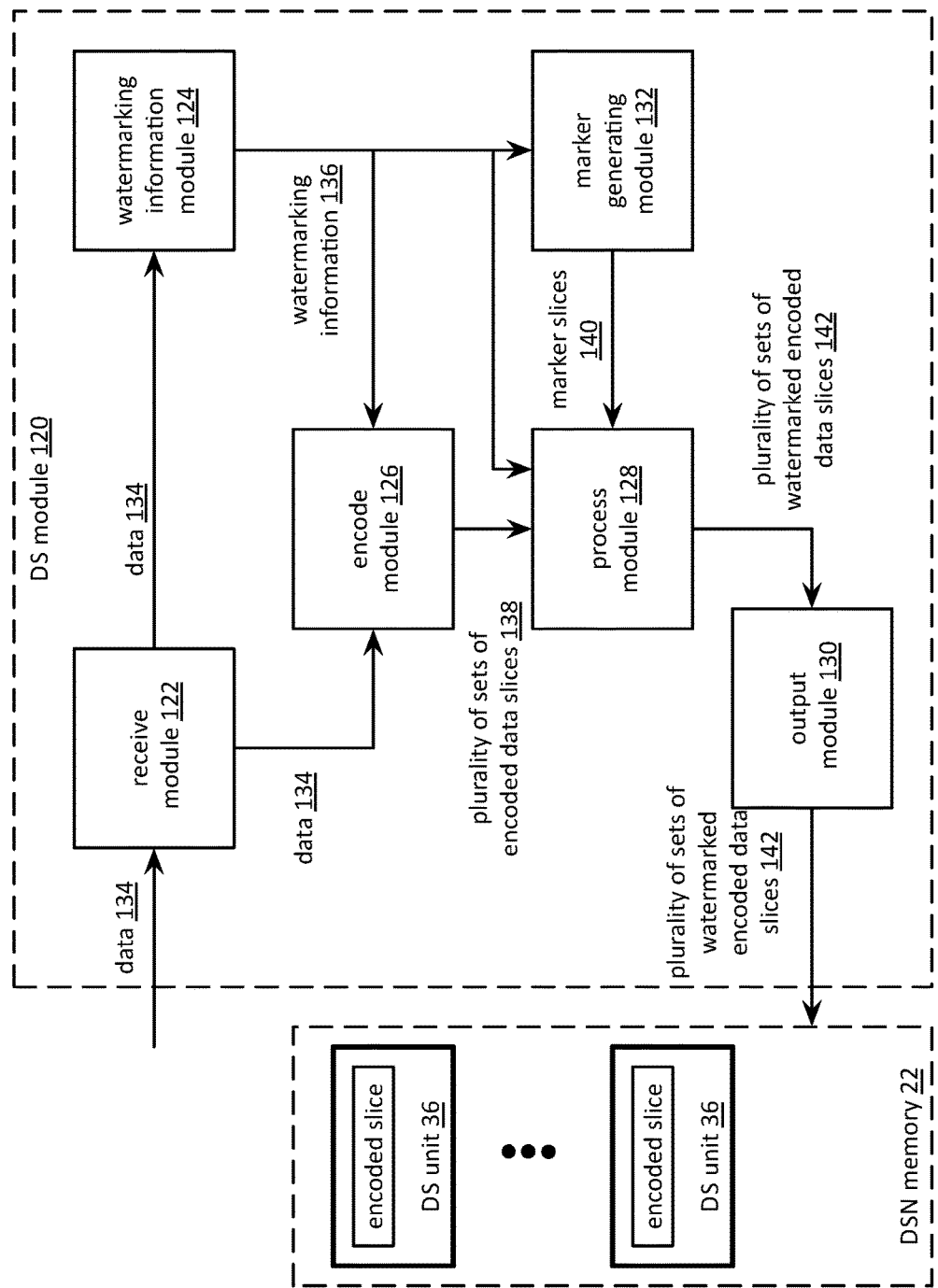
FIG. 7B is a block diagram of a watermarking module in accordance with the invention.

FIG. 7B is a block diagram of a DS module (of a DS processing unit, of a user device, of a storage integrity processing unit, of a DS management unit, etc.) is operable to watermark data in accordance with the method described in FIG. 7A. The DS module 120 includes a receive module 122, a watermarking information module 124, an encode module 126, a process module 128, an output module 130, and a marker generating module 132. The modules 122-132 may be separate modules, sub-modules of another module, and/or a combination thereof.

The receive module 122 facilitates receiving data 134 for storage in a dispersed storage network (DSN) memory 22. The watermarking information module 124 obtains watermarking information 136 regarding a source of the data. The obtaining includes one or more of receiving the watermarking information 136 with the data, initiating a query, performing a lookup, and determining based on one or more of a system performance level and a security requirement level.

The encode module 126 dispersed storage error encodes the data 134 to produce a plurality of sets of encoded data slices 138 (e.g., performs one or more of the functions of grid module of FIG. 4 to produce the encoded data slices). The dispersed storage error encoding the data further includes error encoding the data in accordance with the watermarking information 136, wherein the watermarking information 136 includes at least one of a watermarking pattern indicator (e.g., delete slices, replace slices, fixed pillars, pseudorandom pillars), error coding dispersal storage function parameters (e.g., pillar width, write threshold, read threshold, decode threshold), and one or more error coding generator matrixes (e.g., to directly generate sets of slices where some slices are missing). The plurality of sets of encoded data slices 138 may include zero to a pillar width less a decode threshold number (e.g., n-k) of missing slices per set (e.g., produced by one of encoding a full pillar width number of encoded data slices and then deleting 0 to n-k slices per set; and utilizing a special encoding matrix for each set such that that 0 to n-k slices per set are not produced). For example, the encode data module 126 dispersed storage error encodes the data 134 in accordance with an error coding generator matrix of the one or more error coding generator matrixes to produce the plurality of sets of encoded data slices 138. As another example, the encode data module 126 dispersed storage error encodes the data 134 in accordance with the error coding dispersal storage function parameters to produce the plurality of sets of encoded data slices 138.

The marker generating module 132 generates marker slices 140 in accordance with the watermarking information 136 by accessing a marker slice list of a plurality of marker slices to retrieve the marker slices or generates the marker slices 140 in accordance with the watermarking information 136 by retrieving watermarking data and watermarking error coding dispersal storage parameters and error encoding the watermark data based on the watermarking error coding dispersal storage parameters to produce the marker slices 140. The marker generating module 132 may generate 0 to a pillar width less a decode threshold number (e.g., n-k) of marker slices 140 per set of encoded data slices.

The process module 128 processes the plurality of sets of encoded data slices 138 and marker slices 140 to produce a plurality of sets of watermarked encoded data slices 142 to have a pattern of encoded data slices and the marker slices 140 in accordance with the watermarking information 136. The process module 128 may process the plurality of sets of encoded data slices 138 and marker slices 140 by replacing encoded data slices of the plurality of sets of encoded data slices 138 with marker slices 140 in accordance with the watermarking pattern indicator to produce the plurality of sets of watermarked encoded data slices 142. Alternatively, or in addition to, a process module 128 may process the plurality of sets of encoded data slices 138 and marker slices 140 by inserting marker slices 140 into gaps of the plurality of sets of encoded data slices in accordance with the watermarking pattern indicator to produce the plurality of sets of watermarked encoded data slices 142.

The output module 130 facilitates outputting the plurality of sets of watermarked encoded data slices 142 to the DSN memory 22 for storage therein. Alternatively, or in addition to, the output module 130 facilitates outputting the plurality of sets of watermarked encoded data slices 142 to a receiving entity.

FIG. 8A is a flowchart illustrating an example of validating sets of watermarked encoded data slices. The method begins with step 150 where a processing module receives a data retrieval request (e.g., from a requesting entity) for data stored as a plurality of sets of watermarked encoded data slices in a dispersed storage network (DSN) memory. The method continues at step 152 where the processing module obtains watermarking information associated with the data. The obtaining includes one or more of receiving the watermarking information with the data retrieval request, initiating a query, performing a lookup, and determining based on one or more of a system performance level, a user identity associated with the data, and a security requirement level. For example, the processing module obtains the watermarking information based on a watermarking table lookup corresponding to a user ID of D45A associated with the data.

The method continues at step 154 where the processing module retrieves the plurality of sets of watermarked encoded data slices from the DSN memory the method continues. The method continues at step 156 where the processing module identifies marker slices of the plurality of sets of watermarked encoded data slices. The identifying marker slices includes at least one of comparing a watermarked encoded data slice to an expected marker slice of a marker slice list of the watermarking information to identify a potential marker slice when the comparison indicates that the watermarked encoded data slice is substantially the same as the expected marker slice; decoding the plurality of sets of watermarked encoded data slices in accordance with dispersed storage error coding parameters using different combinations of marker slices and encoded data slices of a set of the plurality of sets of watermarked encoded data slices to identify potential maker slices; and validating the potential marker slices in accordance with the watermarking information to produce the marker slices (e.g., indicating valid identified marker slices).

The processing module may decode a set of the plurality of sets of watermarked encoded data slices using different combinations of marker slices and encoded data slices of to identify the potential marker slices by dispersed storage error decoding a first decode threshold number of watermarked encoded data slices of the set to produce a first result; dispersed storage error decoding a second decode threshold number of watermarked encoded data slices of the set to produce a second result, wherein the second decode threshold number of watermarked encoded data slices are substantially the same as the first decode threshold number of watermarked encoded data slices except for one watermarked encoded data slice; and identifying the one watermarked encoded data slice as the potential marker slice when the first result is substantially different than the second result.

The method continues at step 158 where the processing module determines whether the marker slices are in accordance with the watermarking information. The determining whether the marker slices are in accordance with the watermarking information includes detecting a pattern of the marker slices and the plurality of sets of encoded data slices of the plurality of sets of watermarked encoded data slices and determining whether the pattern compares favorably to a watermarking pattern of the watermarking information. The detecting a pattern includes one or more of identifying at least one of an associated pillar number and an associated data segment number for each marker slice of the identified marker slices, identifying one or more missing watermarked encoded data slices of the plurality of sets of watermarked encoded data slices (e.g., the watermarking pattern may include missing slices), and identifying at least one of an associated pillar number and an associated data segment number for each missing watermarked encoded data slice of the one or more missing watermarked encoded data slices.

The determining whether the pattern compares favorably includes at least one of indicating that the pattern compares favorably when the pattern is substantially the same as a composite watermarking template of the watermarking information (e.g., a template includes which segments include markers at which pillars and which segments include missing slices at which pillars) and indicating that the pattern compares favorably when the plurality of sets of watermarked encoded data slices is substantially the same as a synthesized plurality of sets of watermarked encoded data slices. The processing module may generate the synthesized plurality of sets of watermarked encoded data slices by decoding the plurality of sets of watermarked encoded data slices to reproduce the data and re-encoding the reproduced data based on the watermarking information to produce the synthesized plurality of sets of watermarked encoded data slices.

The method branches to step 162 when the processing module determines that the marker slices are in accordance with the watermarking information. The method continues to step 160 when the processing module determines that the marker slices are not in accordance with the watermarking information. The method continues at step 160 where the processing module indicates a potential authentication issue regarding the storage of the data when the marker slices are not in accordance with the watermarking information. For example, the processing module sends an authentication message to the requesting entity, wherein the authentication message indicates that a potential data authentication issue exists.

The method continues at step 162 where the processing module dispersed storage error decodes a plurality of sets of encoded data slices of the plurality of sets of watermarked encoded data slices to reproduce the data when the marker slices are in accordance with the watermarking information. The processing module may not exclude the marker slices in the decoding step. The method continues at step 164 where the processing module outputs the data to the requesting entity. Such outputting may include one or more of sending the data to the requesting entity, saving the data in a local memory, and transmitting the data via a network.

Figure 8B:
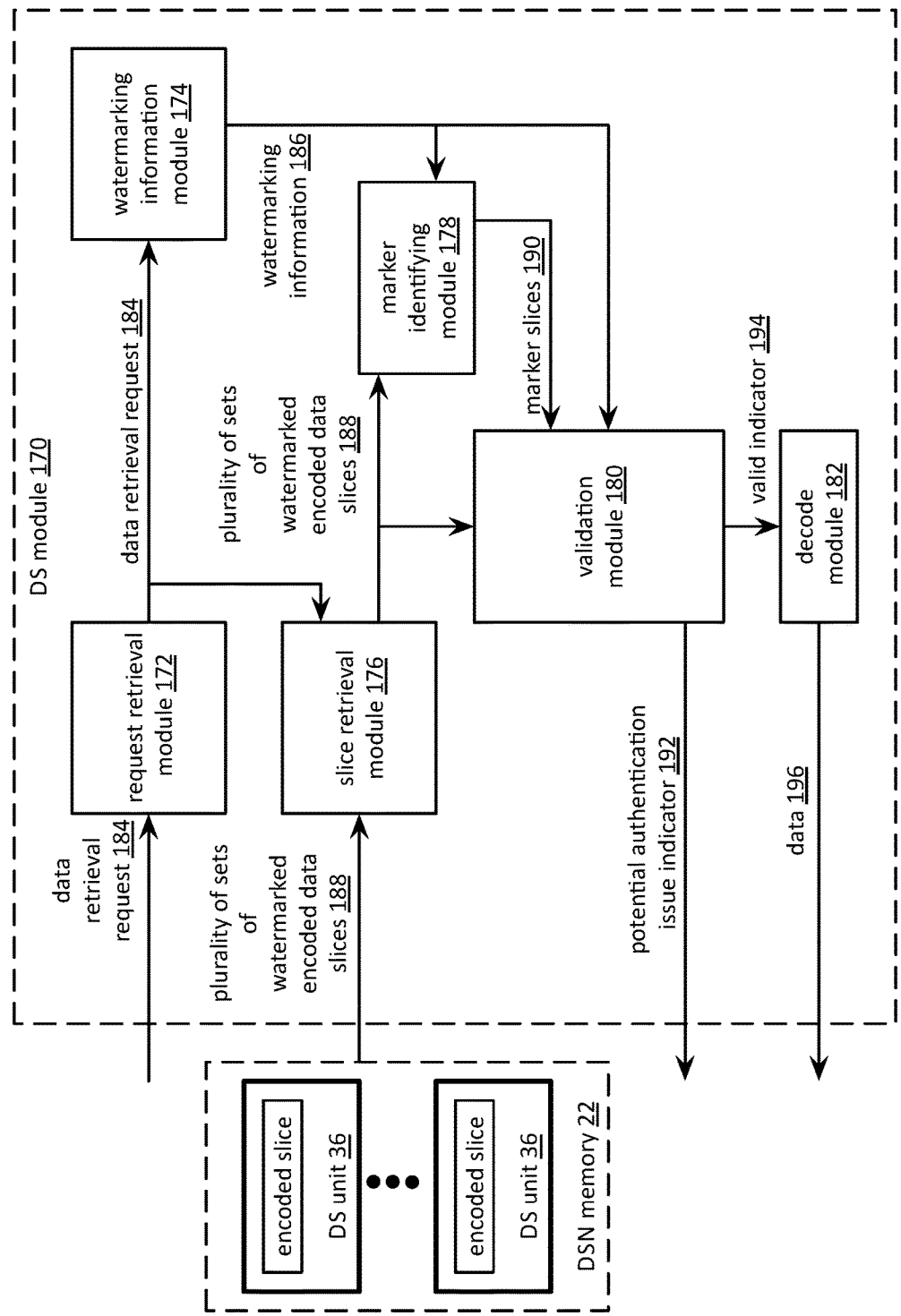
FIG. 8B is a block diagram of a validating module in accordance with the invention.

FIG. 8B is a block diagram of a DS unit (of a DS processing unit, of a user device, of a storage integrity processing unit, of a DS management unit, etc.) is operable to validate watermarked data in accordance with the method described in FIG. 8A. The DS module 170 includes a request retrieval module 172, a watermarking information module 174, a slice retrieval module 176, a marker identifying module 178, a validation module 180, and a decode module 182. The modules 172-182 may be separate modules, sub-modules of another module, and/or a combination thereof.

The request retrieval module 172 facilitates receiving a data retrieval request 184 for data 196 stored as a plurality of sets of watermarked encoded data slices 188 in a dispersed storage network (DSN) memory 22. The watermarking information module 174 obtains watermarking information 186 associated with the data 196. The obtaining includes one or more of receiving the watermarking information 186 with the data retrieval request 184, initiating a query, performing a lookup, and determining based on one or more of a system performance level, a user identity associated with the data, and a security requirement level.

The slice retrieval module 176 facilitates retrieving the plurality of sets of watermarked encoded data slices 188 from the DSN memory 22. The marker identifying module 178 identifies marker slices 190 of the plurality of sets of watermarked encoded data slices 188. The identifying of marker slices 190 includes comparing a watermarked encoded data slice to an expected marker slice of a marker slice list of the watermarking information 186 to identify a potential marker slice when the comparison indicates that the watermarked encoded data slice is substantially the same as the expected marker slice; decoding the plurality of sets of watermarked encoded data slices 188 in accordance with dispersed storage error coding parameters using different combinations of marker slices and encoded data slices of a set of the plurality of sets of watermarked encoded data slices 188 to identify potential maker slices; and validating the potential marker slices in accordance with the watermarking information to produce the marker slices 190 (e.g., indicating valid identified marker slices).

The DS module may decode a set of the plurality of sets of watermarked encoded data slices 188 using different combinations of marker slices and encoded data slices of to identify the potential marker slices by dispersed storage error decoding a first decode threshold number of watermarked encoded data slices of the set to produce a first result; dispersed storage error decoding a second decode threshold number of watermarked encoded data slices of the set to produce a second result, wherein the second decode threshold number of watermarked encoded data slices are substantially the same as the first decode threshold number of watermarked encoded data slices except for one watermarked encoded data slice; and identifying the one watermarked encoded data slice as the potential marker slice when the first result is substantially different than the second result.

The validation module 180 determines whether the marker slices 190 are in accordance with the watermarking information 186. The validation module 180 indicates a potential authentication issue utilizing a potential authentication issue indicator 192 regarding the storage of the data when the marker slices 190 are not in accordance with the watermarking information 186. The validation module 180 indicates valid data utilizing a valid indicator 194 when the marker slices 190 are in accordance with the watermarking information 186. The determining whether the marker slices 190 are in accordance with the watermarking information 186 includes detecting a pattern of the marker slices 190 and the plurality of sets of encoded data slices of the plurality of sets of watermarked encoded data slices 188 and determining whether the pattern compares favorably to a watermarking pattern of the watermarking information 186. The detecting a pattern includes identifying at least one of an associated pillar number and an associated data segment number for each marker slice of the identified marker slices, identifying one or more missing watermarked encoded data slices of the plurality of sets of watermarked encoded data slices 188 (e.g., the watermarking pattern may include missing slices), and/or identifying at least one of an associated pillar number and an associated data segment number for each missing watermarked encoded data slice of the one or more missing watermarked encoded data slices.

The determining whether the pattern compares favorably includes at least one of indicating that the pattern compares favorably when the pattern is substantially the same as a composite watermarking template of the watermarking information (e.g., a template includes which segments include markers at which pillars and which segments include missing slices at which pillars) and indicating that the pattern compares favorably when the plurality of sets of watermarked encoded data slices 188 is substantially the same as a synthesized plurality of sets of watermarked encoded data slices. The DS module may generate the synthesized plurality of sets of watermarked encoded data slices by decoding the plurality of sets of watermarked encoded data slices 188 to reproduce the data and re-encoding the reproduced data based on the watermarking information to produce the synthesized plurality of sets of watermarked encoded data slices.

The decode module 182 dispersed storage error decodes a plurality of sets of encoded data slices of the plurality of sets of watermarked encoded data slices 188 to reproduce the data 196 when the marker slices 190 are in accordance with the watermarking information 186 as indicated by the valid indicator 194.

Figure 9:
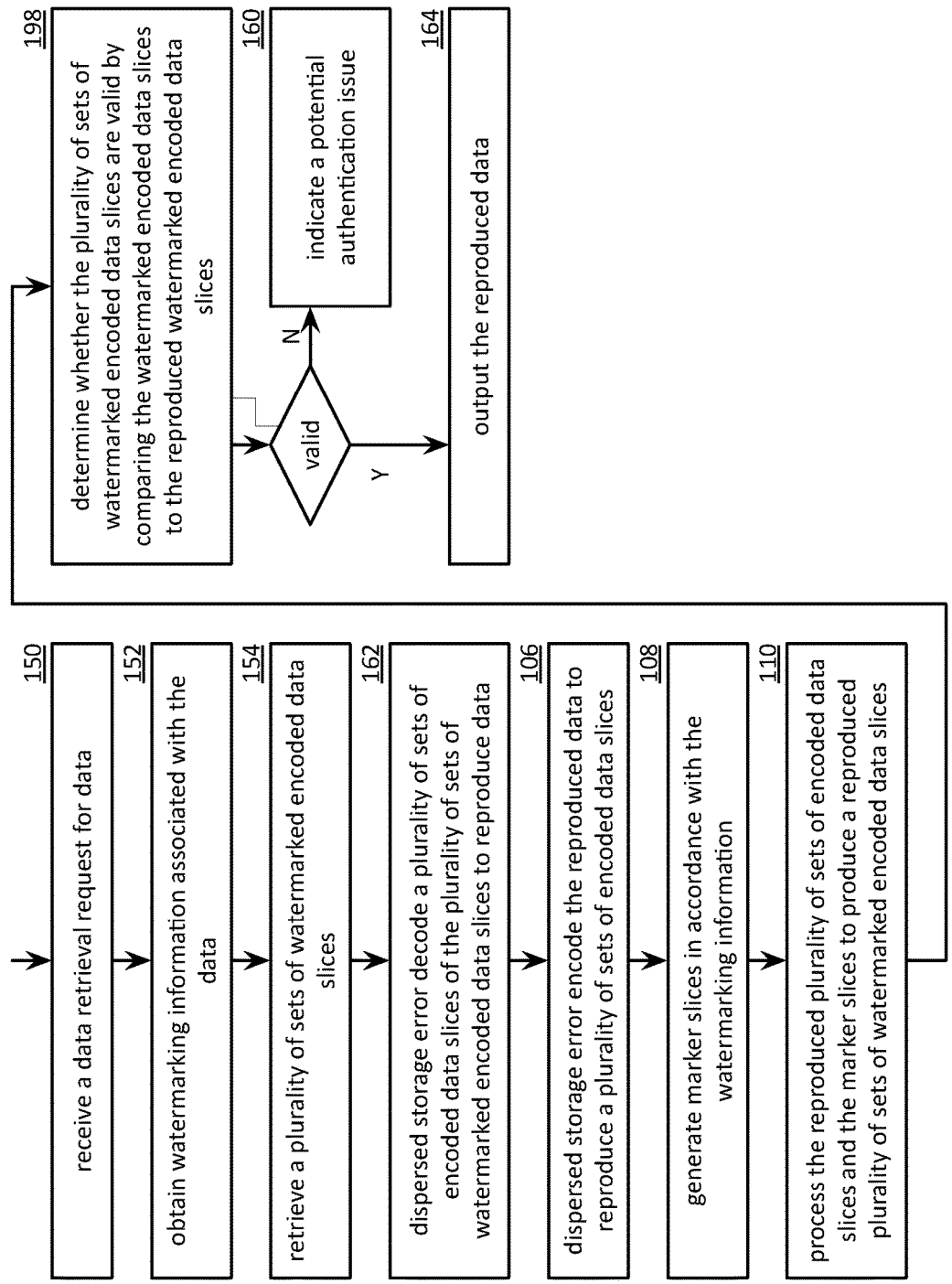
FIG. 9 is a flowchart illustrating another example of validating sets of watermarked encoded data slices in accordance with the invention.

FIG. 9 is a flowchart illustrating another example of validating sets of watermarked encoded data slices, which includes many similar steps to FIGS. 7A and 8A. The method begins with steps 150-162 of FIG. 8A where a processing module (e.g., of a dispersed storage (DS) processing module) receives a data retrieval request for data, obtains watermarking information associated with the data, retrieves a plurality of sets of watermarked encoded data slices, and dispersed storage error decodes a plurality of sets of encoded data slices of the plurality of sets of watermarked encoded data slices to reproduce data. The method continues with steps 106-110 of FIG. 7A where the processing module dispersed storage error encodes the reproduced data to reproduce a plurality of sets of encoded data slices, generates marker slices in accordance with the watermarking information, and processes the reproduced plurality of sets of encoded data slices and the marker slices to produce a reproduced plurality of sets of watermarked encoded data slices.

The method continues at step 198 where the processing module determines whether the plurality of sets of watermarked encoded data slices are valid by comparing the watermarked encoded data slices to the reproduced watermarked encoded data slices. For example, the processing module determines that the plurality of sets of watermarked encoded data slices are valid when the watermarked encoded data slices are substantially the same as the reproduced watermarked encoded data slices. As another example, the processing module determines that the plurality of sets of watermarked encoded data sources are valid when the comparison indicates that there are less than an error threshold number of differences between the watermarked encoded data slices and the reproduced watermarked encoded data slices.

The method branches to step 164 of FIG. 8A when the processing module determines that the plurality of sets of watermarked encoded data slices are valid. The method continues to step 160 of FIG. 8A when the processing module determines that the plurality of sets of watermarked encoded data slices are not valid. The method continues at step 160 of FIG. 8A where the processing module indicates a potential authentication issue. The method continues at step 164 of FIG. 8A where the processing module outputs the reproduced data when the plurality of sets of watermarked encoded data slices are valid.

Figure 10A:
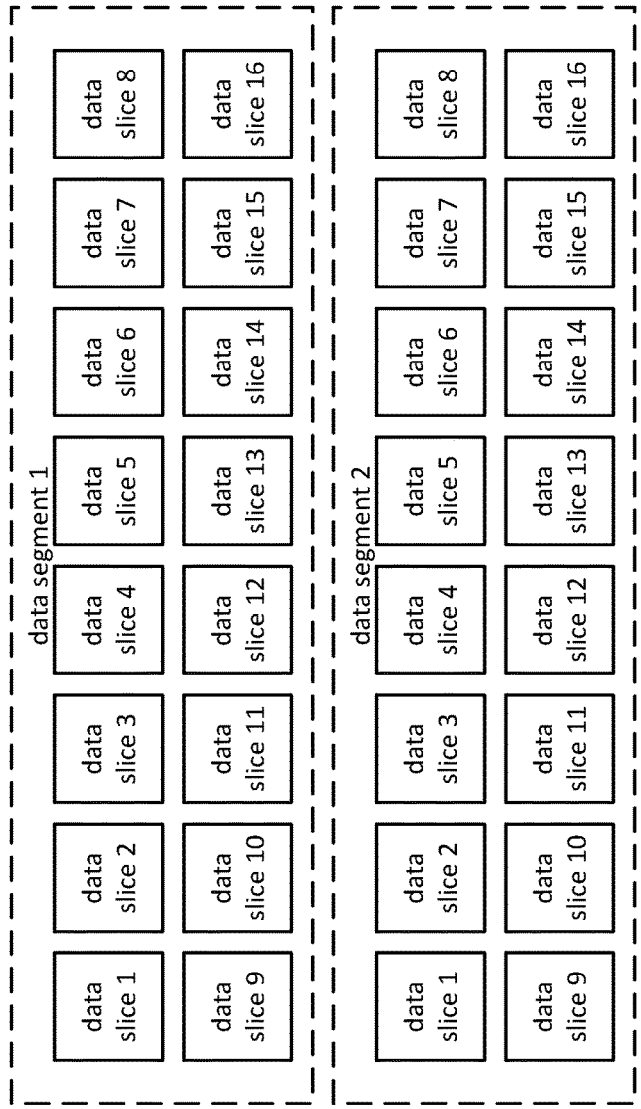
FIG. 10A is a diagram illustrating an example of a plurality of sets of encoded data slices in accordance with the invention.
Figure 10B:
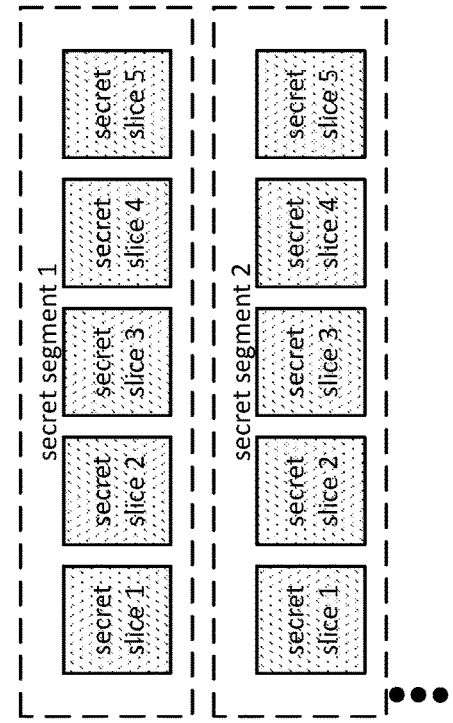
FIG. 10B is a diagram illustrating an example of a plurality of sets of encoded secret slices in accordance with the invention.
Figure 10C:
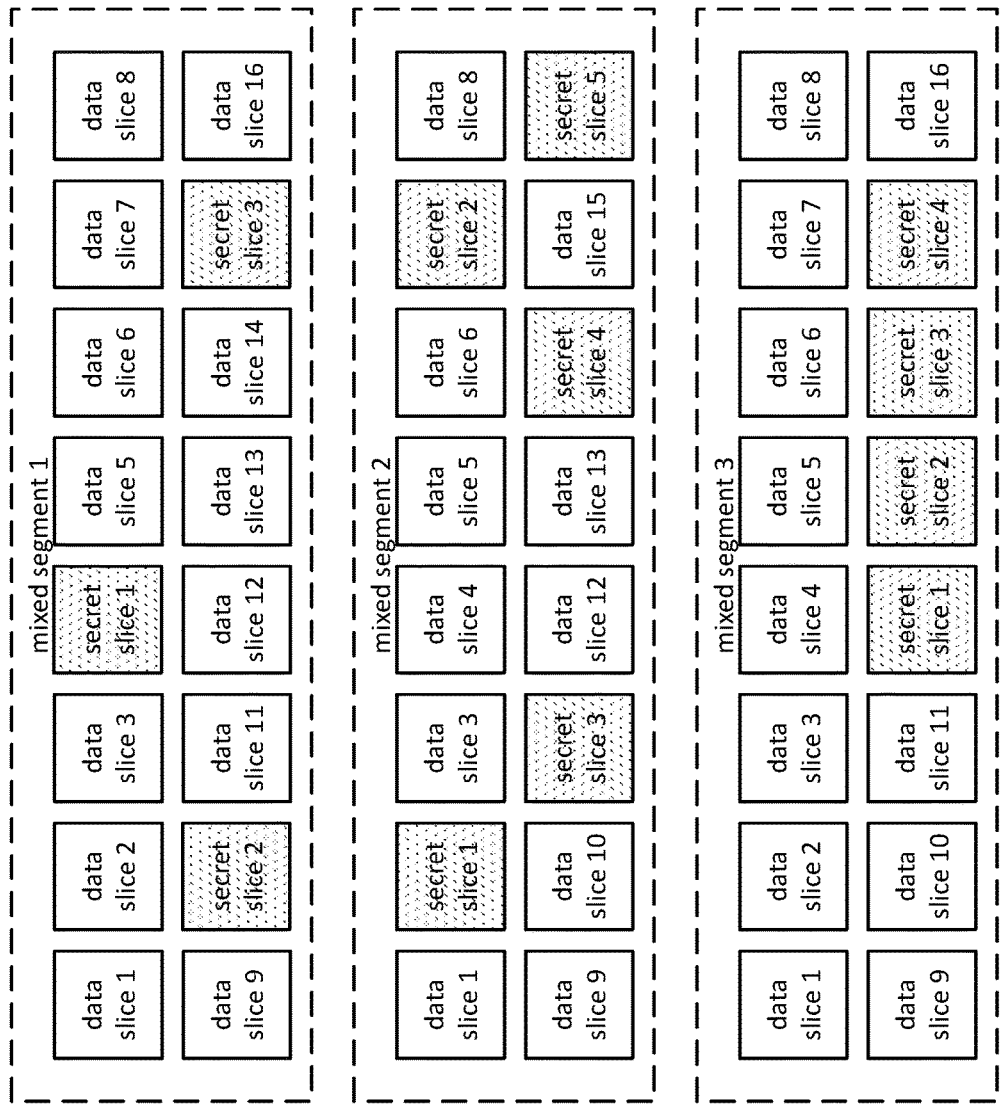
FIG. 10C is a diagram illustrating an example of a plurality of sets of encoded mixed slices in accordance with the invention.

FIGS. 10A-10C illustrate three example steps to produce a plurality of sets of encoded mixed slices to obfuscate secret data. FIG. 10A illustrates producing a plurality of sets of encoded data slices to later include secret data. FIG. 10B illustrates producing a plurality of sets of encoded secret slices from the secret data. FIG. 10C illustrates replacing at least some of the encoded data slices of the plurality of sets of encoded data slices with encoded secret slices of the plurality of sets of encoded secret slices. The method to produce the plurality of sets of encoded mixed slices (e.g., to hide the secret data) is discussed in greater detail with reference to FIG. 12A and the method to recover the secret data from the plurality of sets of encoded mixed slices is discussed in greater detail with reference to FIG. 13A.

FIG. 10A is a diagram illustrating an example of a plurality of sets of encoded data slices wherein sets of data slices 1-16 corresponds to data segments of a plurality of data segments. Data is divided into the plurality of data segments, wherein each data segment of the plurality of data segments is dispersed storage error encoded to produce a set of slices of the plurality of sets of encoded data slices. A number of sets (e.g., data segments) is based on a size of the data and data error coding dispersal storage function parameters (e.g., data segment size). For example, data is dispersed storage error encoded to produce a plurality of sets of slices corresponding to a plurality of data segments, wherein each set of slices includes 16 pillars when a pillar width is 16. For instance, the data is dispersed storage error encoded to produce a data segment 1 that includes corresponding data slices 1-16, data segment 2 that includes corresponding data slices 1-16, etc.

The data is dispersed storage error encoded to produce the plurality of sets of encoded data slices in accordance with error coding dispersed storage function parameters, wherein the parameters include a pillar width and a decode threshold. For example, data is dispersed storage error encoded to produce a plurality of sets of 16 encoded data slices per set, wherein at least 10 encoded data slices per set of 16 encoded data slices are required to decode the plurality of sets of encoded data slices to reproduce the data when a decode threshold is 10 and a pillar width is 16. Each set of encoded data slices is decodable when any at most (pillar width-decode threshold) number of slices is missing and/or corrupt. For example, data segment 2 is decodable when corresponding data slices 11-16 are not available and slices 1-10 are available when the pillar width is 16 and the decode threshold is 10. As another example, data segment 1 is decodable when corresponding data slices 4, 10, and 15 are not available and slices 1-3, 5-9, 11-14, and 16 are available when the pillar width is 16 and the decode threshold is 10.

FIG. 10B is a diagram illustrating an example of a plurality of sets of encoded secret slices wherein sets of secret slices 1-5 correspond to secret segments of a plurality of secret segments. Secret data is divided into the plurality of secret segments, wherein each secret segment of the plurality of secret segments is dispersed storage error encoded to produce a set of secret slices of the plurality of sets of encoded secret slices. A number of sets (e.g., segments) is based on a size of the secret data and secret error coding dispersal storage function parameters (e.g., secret segment size). For example, secret data is dispersed storage error encoded to produce a plurality of sets of secret slices corresponding to a plurality of secret segments, wherein each set of secret slices includes 5 pillars when a pillar width is 5. For instance, the secret data is dispersed storage error encoded to produce a secret segment 1 that includes corresponding secret slices 1-5, secret segment 2 that includes corresponding secret slices 1-5, etc.

The secret data is dispersed storage error encoded to produce the plurality of sets of encoded secret slices in accordance with secret error coding dispersed storage function parameters, wherein the parameters include a pillar width and a decode threshold. For example, secret data is dispersed storage error encoded to produce a plurality of sets of 5 encoded secret slices per set, wherein at least 3 encoded secret slices per set of 5 encoded secret slices are required to decode the plurality of sets of encoded secret slices to reproduce the secret data when a decode threshold is 3 and a pillar width is 5. Each of encoded secret slices is decodable when any at most (pillar width-decode threshold) number of secret slices is missing and/or corrupt. For example, secret segment 2 is decodable when corresponding secret slices 4-5 are not available and corresponding secret slices 1-3 are available when the pillar width is 5 and the decode threshold is 3. As another example, secret segment 1 is decodable when corresponding secret slice 1 is not available and corresponding secret slices 2-5 are available when the pillar width is 5 and the decode threshold is 3.

FIG. 10C is a diagram illustrating an example of a plurality of sets of encoded mixed slices wherein sets of corresponding encoded mixed slices 1-16 correspond to mixed segments of a plurality of mixed segments. At least some data slices of a set of encoded data slices of each data segment of a plurality of data segments are mixed with at least some secret slices of a set of encoded secret slices of each secret segment of a plurality of secret segments to produce the plurality of mixed segments in accordance with a data hiding method. The data hiding method includes one or more of which fixed data pillars to replace, how many secret slices per segment to insert into the set of encoded data slices, which predetermined pattern of pillars to replace slices, and a pseudorandom pillar selection algorithm. A minimum of a secret decode threshold number of data slices of each set of encoded data slices of a plurality of sets of encoded data slices are replaced with secret slices of a corresponding set of encoded secret slices to produce the plurality of sets of encoded mixed slices. For example, secret slice 1 replaces data slice 4, secret slice 2 replaces data slice 10, and secret slice 3 replaces data slice 15 to produce mixed segment 1 from a set of encoded data slices of data segment 1 and a set of encoded secret slices of secret segment 1 in accordance with the data hiding method when the secret decode threshold is 3.

The secret decode threshold number may not be greater than an encoded data pillar width minus an encoded data decode threshold number. For example, at most 6 data slices of a set of encoded data slices may be replaced with secret slices when a pillar width is 16 and a decode threshold is 10 associated with the set of encoded data slices. For instance, all 5 secret slices of a set of encoded secret slices may be utilized to replace any 5 data slices of a set of encoded data slices when the pillar width is 16 and the decode threshold is 10 associated with the set of encoded data slices and a pillar width is 5 and a decode threshold is 3 associated with the set of encoded secret slices. As another instance, secret slice 1 replaces data slice 2, secret slice 2 replaces data slice 7, secret slice 3 replaces data slice 11, secret slice 4 replaces data slice 14, and secret slice 5 replaces data slice 16 to produce mixed segment 2 from a set of encoded data slices of data segment 2 and a set of encoded secret slices of secret segment 2 in accordance with the data hiding method when a secret pillar width is 5 (e.g., wherein 5 is less than 16-10).

Secret slices replace data slices associated with pillars greater than the first decode threshold number of pillars when improved retrieval performance is desired for data encoded as the data slices when the data was previously encoded utilizing an encoding matrix containing a unity matrix to produce the first decode threshold number of slices that are substantially the same as data. For example, secret slice 1 replaces data slice 12, secret slice 2 replaces data slice 13, secret slice 3 replaces data slice 14, and secret slice 4 replaces data slice 15 to produce mixed segment 3 from a set of encoded data slices of data segment 3 and a set of encoded secret slices of secret segment 3 in accordance with the data hiding method when data of the data slices was previously encoded to produce data slices 1-10, wherein data slices 1-10 are substantially the same as the data.

Figure 11A:
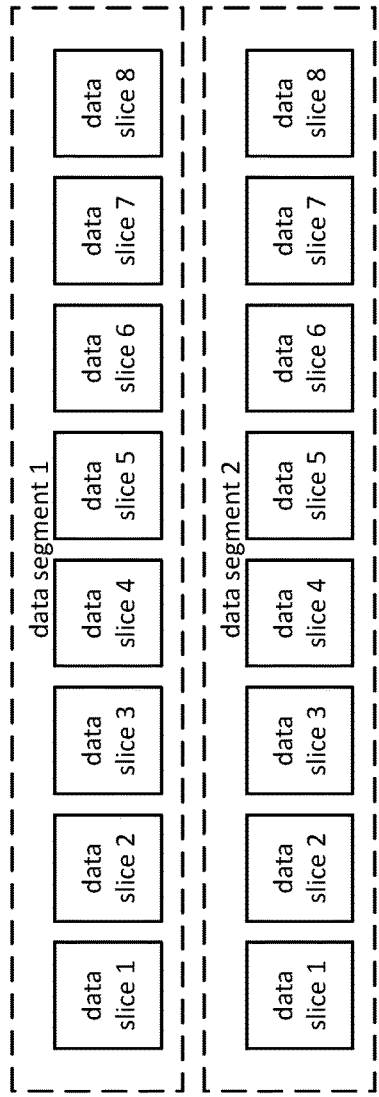
FIG. 11A is a diagram illustrating another example of a plurality of sets of encoded data slices in accordance with the invention.
Figure 11B:
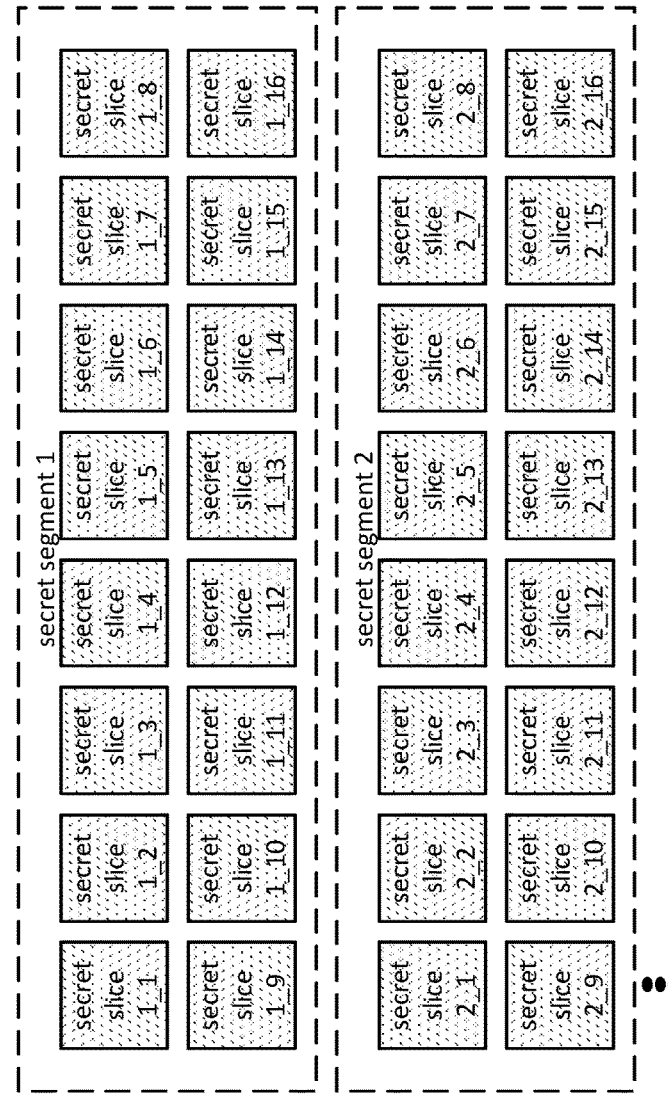
FIG. 11B is a diagram illustrating another example of a plurality of sets of encoded secret slices in accordance with the invention.

FIGS. 11A-11C illustrate three steps to generate a plurality of sets of encoded mixed slices that obfuscate secret data. FIG. 11A illustrates generating a plurality of sets of encoded data slices to later include secret data. FIG. 11B illustrates generating a plurality of sets of encoded secret slices from the secret data. FIG. 11C illustrates replacing at least some of the encoded data slices of the plurality of sets of encoded data slices with encoded secret slices of the plurality of sets of encoded secret slices. The method to generate the plurality of sets of encoded mixed slices to obfuscate the secret data is discussed in greater detail with reference to FIG. 12A and the method to de-obfuscate the secret data from the plurality of sets of encoded mixed slices is discussed in greater detail with reference to FIG. 13A.

FIG. 11A is a diagram illustrating another example of a plurality of sets of encoded data slices wherein sets of data slices 1-8 correspond to data segments of a plurality of data segments. Data is segmented into the plurality of data segments and each data segment of the plurality of data segments is dispersed storage error encoded to produce a set of slices of the plurality of sets of encoded data slices. A number of sets is based on a size of the data and data error coding dispersal storage function parameters (e.g., data segment size). For example, data is dispersed storage error encoded to produce a plurality of sets of slices corresponding to a plurality of data segments, wherein each set of slices includes 8 pillars when a pillar width is 8. For instance, the data is dispersed storage error encoded to produce a data segment 1 that includes corresponding data slices 1-8, data segment 2 that includes corresponding data slices 1-8, etc.

The data is dispersed storage error encoded to produce the plurality of sets of encoded data slices in accordance with error coding dispersed storage function parameters, wherein such parameters include a pillar width and a decode threshold. For example, data is dispersed storage error encoded to produce a plurality of sets of 8 encoded data slices per set, wherein at least 5 encoded data slices per set of 8 encoded data slices are required to decode the plurality of sets of encoded data slices to reproduce the data when a decode threshold is 5 and a pillar width is 8. Each set of encoded data slices is decodable when any (pillar width-decode threshold) number of slices are missing and/or corrupt. For example, data segment 2 is decodable when corresponding data slices 6-8 are not available and slices 1-5 are available when the pillar width is 8 and the decode threshold is 5. As another example, data segment 1 is decodable when corresponding data slice 4 is not available (e.g., just one pillar is missing) and slices 1-3 and 5-8 are available when the pillar width is 8 and the decode threshold is 5.

FIG. 11B is a diagram illustrating another example of a plurality of sets of encoded secret slices. Sets of secret slices 1-16 correspond to secret segments of a plurality of secret segments. Secret data is segmented into the plurality of secret segments and each secret segment of the plurality of secret segments is dispersed storage error encoded to produce a set of secret slices of the plurality of sets of encoded secret slices. A number of sets (e.g., segments) is based on a size of the secret data and secret error coding dispersal storage function parameters (e.g., secret segment size). For example, secret data is dispersed storage error encoded to produce a plurality of sets of secret slices corresponding to a plurality of secret segments, wherein each set of secret slices includes 16 pillars when a pillar width is 16. For instance, the secret data is dispersed storage error encoded to produce a secret segment 1 that includes corresponding secret slices 1-16, secret segment 2 that includes corresponding secret slices 1-16, etc.

The secret data is dispersed storage error encoded to produce the plurality of sets of encoded secret slices in accordance with secret error coding dispersed storage function parameters, wherein such parameters include a pillar width and a decode threshold. For example, secret data is dispersed storage error encoded to produce a plurality of sets of 16 encoded secret slices per set, such that at least 10 encoded secret slices per set of 16 encoded secret slices are required to decode the plurality of sets of encoded secret slices to reproduce the secret data when a decode threshold is 10 and a pillar width is 16. Each set of encoded secret slices is decodable when any (pillar width-decode threshold) number of secret slices are missing and/or corrupt. For example, secret segment 2 is decodable when corresponding secret slices 11-16 are not available and corresponding secret slices 1-10 are available when the pillar width is 16 and the decode threshold is 10. As another example, secret segment 1 is decodable when corresponding secret slice 1 is not available and corresponding secret slices 2-16 are available when the pillar width is 16 and the decode threshold is 10.

FIG. 11C is a diagram illustrating another example of a plurality of sets of encoded mixed slices. Sets of corresponding encoded mixed slices 1-8 correspond to mixed segments of a plurality of mixed segments. At least some data slices of at least one set of a plurality of sets of encoded data slices of a plurality of data segments are mixed with at least a secret decode threshold number of secret slices from each set of a plurality of sets of encoded secret slices of a plurality of secret segments to produce the plurality of mixed segments in accordance with a dispersed data hiding method. Such a dispersed data hiding method includes one or more of which fixed data pillars to replace, how many secret slices per segment to insert one at a time across a same number of sets of encoded data slices, which predetermined pattern of pillars to replace slices, and a pseudorandom pillar selection algorithm. A minimum of zero and a maximum of an encoded data pillar width minus an encoded data decode threshold number data slices of each set of encoded data slices of a plurality of sets of encoded data slices are replaced with secret slices to produce the plurality of sets of encoded mixed slices.

For example, secret slice 1_1 replaces data slice 4 of data segment 1 to produce mixed segment 1, secret slice 1_2 replaces data slice 6 of data segment 2 to produce mixed segment 2, etc, secret slice 1_16 replaces data slice 2 of data segment 16 to produce mixed segment 16, secret slice 2_1 replaces data slice 7 of data segment 17 to produce mixed segment 17, secret slice 2_2 replaces data slice 1 of data segment 18 to produce mixed segment 18, etc., from a plurality of sets of encoded data slices and a plurality of sets of encoded secret slices in accordance with the dispersed data hiding method when a full secret pillar width number (e.g., 16) of secret slices replace one encoded data slice of a corresponding number of sets of encoded data slices to produce the plurality of sets of encoded mixed slices. The secret data may be decodable even when one or more mixed segments are not decodable since any missing next segment only introduces one secret slice error.

Figure 12A:
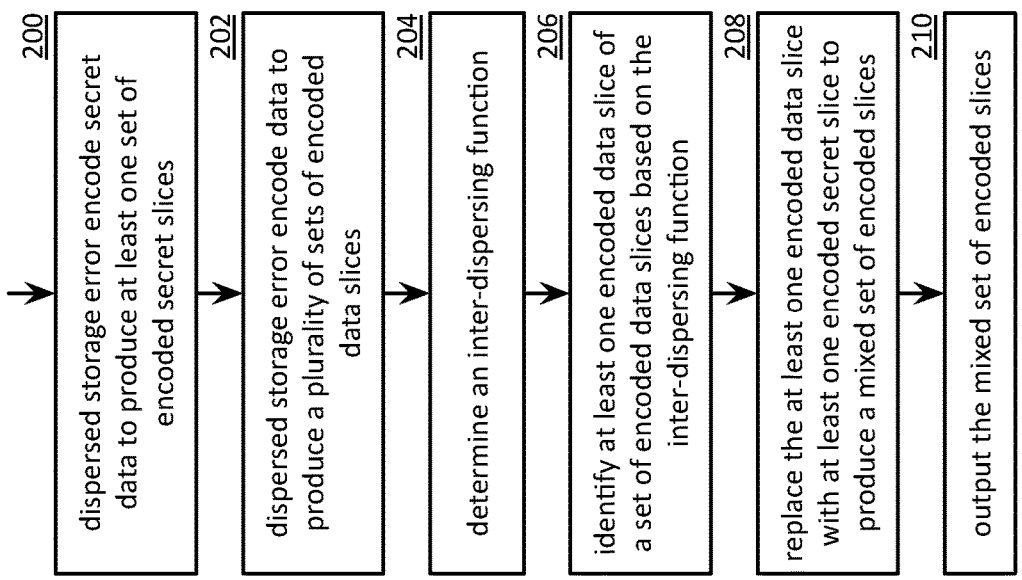
FIG. 12A is a flowchart illustrating an example of hiding data in accordance with the invention.

FIG. 12A is a flowchart illustrating an example of hiding data. The method begins at step 200 where a processing module (e.g., of a dispersed storage (DS) processing unit) dispersed storage error encodes secret data in accordance with first dispersed storage error encoding parameters to produce at least one set of encoded secret slices. The method continues at step 202 where the processing module dispersed storage error encodes data in accordance with second dispersed storage error encoding parameters to produce a plurality of sets of encoded data slices. The secret data may relate to information regarding the data. For example, the secret data may include one or more of a private encryption key, a signed certificate, an encryption algorithm identifier, wherein at least some of the secret data is associated with the data. For instance, the data may include encrypted data, wherein the encrypted data was produced utilizing the private encryption key of the secret data. Alternatively, the secret data contains information that is unrelated to the data.

The method continues at step 204 where the processing module determines an inter-dispersing function for outputting the sets of encoded secret slices and the plurality of sets of encoded data slices. The inter-dispersing function indicates an approach of a plurality of approaches to inter-disperse the at least one set of encoded secret slices with the plurality of sets of encoded data slices. The plurality of approaches includes a horizontal approach and a vertical approach. The horizontal approach includes replacing at least a secret decode threshold number (e.g., of the first dispersed storage error encoding parameters) of encoded data slices of a set of encoded data slices with at least a secret decode threshold number of encoded secret slices of the at least one set of encoded secret slices (e.g., encoded secret slices of a set of secret encoded slices are dispersed horizontally across a set of encoded data slices, set by set). In addition, the inter-dispersing function may indicate how many encoded data slices of the set of encoded data slices to replace.

The vertical approach includes replacing less than the secret decode threshold number of encoded data slices of the set of encoded data slices with less than a secret decode threshold number of encoded secret slices of the at least one set of encoded secret slices (e.g., encoded secret slices are dispersed vertically down a series of sets of encoded data slices). The determination may be based on one or more of a secret data detectability requirement, a secret data size indicator, a data size indicator, a data reliability requirement, a secret data reliability requirement, receiving the approach, a retrieval latency requirement, retrieving the approach, a lookup, a query, a system performance indicator. For example, the processing module determines the inter-dispersing function to include the horizontal approach when a faster than average retrieval latency of the secret data is required. As another example, the processing module determines the inter-dispersing function to include the vertical approach when a lower than average probability of secret data detectability is required.

The method continues at step 206, for a set of the plurality of encoded data slices, the processing module identifies at least one encoded data slice of the set of encoded data slices based on the inter-dispersing function. The method continues at step 208 where the processing module replaces the at least one encoded data slice with at least one encoded secret slice of the at least one set of encoded secret slices to produce a mixed set of encoded slices. The replacing the at least one encoded data slice with the at least one encoded secret slice includes generating a slice name for an encoded data slice of the at least one encoded data slice and assigning the slice name to an encoded secret slice of the at least one encoded secret slice.

The method continues at step 210 where the processing module outputs the mixed set of encoded slices. The outputting includes updating a directory regarding a set of slice names corresponding to the mixed set of encoded slices. Alternatively, or in addition to, the outputting the mixed set of encoded slices includes outputting the encoded secret slice using the slice name of the encoded data slice. For example, the processing module facilitates sending a plurality of mixed sets of encoded slices to a dispersed storage network (DSN) memory for storage therein utilizing a plurality of sets of slice names corresponding to the plurality of sets of encoded data slices. As another example, the processing module facilitates communicating the plurality of mixed sets of encoded slices via a communication network (e.g., send to a computer, send to a communication device over a wireless communications path). The method may repeat back to step 206 for another set of the plurality of sets of encoded data slices.

The processing module operates in accordance with the inter-dispersing function with regards to steps 204-208. For example, when the inter-dispersing function is the horizontal approach, at step 204, the processing module determines the inter-dispersing function by identifying a first decode threshold and a first pillar width based on the first dispersed storage error encoding parameters; and identifying a second decode threshold and a second pillar width based on the second dispersed storage error encoding parameters, wherein the first decode threshold is less than or equal to a difference between the second pillar width and the second decode threshold. At step 206, the processing module identifies the at least one encoded data slice by identifying a number of encoded data slices of the set of encoded data slices as the at least one encoded data slice to be at least equal to the first decode threshold. At step 208, the processing module replaces the at least one encoded data slice by replacing the number of encoded data slices with at least a first decode threshold number of encoded secret slices of a set of the at least one set of encoded secret slices.

As another example, when the inter-dispersing function is the vertical approach, at step 204, the processing module determines the inter-dispersing function by identifying a first decode threshold and a first pillar width based on the first dispersed storage error encoding parameters. For instance, the first dispersed storage error encoding parameters may include a first pillar width with a higher than average number of pillars and a larger than average difference between the first pillar width and the first decode threshold to improve secret data retrieval reliability as the at least one set of encoded secret slices are inter-dispersed across many sets of encoded data slices.

For the set of the plurality of encoded data slices, at step 206, the processing module identifies the at least one encoded data slice by identifying a number of encoded data slices of the set of encoded data slices as the at least one encoded data slice to be less than the first decode threshold. At step 208, the processing module replaces the at least one encoded data slice by replacing the number of encoded data slices with less than a first decode threshold number of encoded secret slices of a set of the least one set of encoded secret slices. For a second set of the plurality of encoded data slices, at step 206, the processing module identifies a second number of encoded data slices of the second set of encoded data slices to be less than the first decode threshold. At step 208, processing module replaces the second number of encoded data slices with at least one other encoded secret slice of the set of the least one set of encoded secret slices.

Figure 12B:
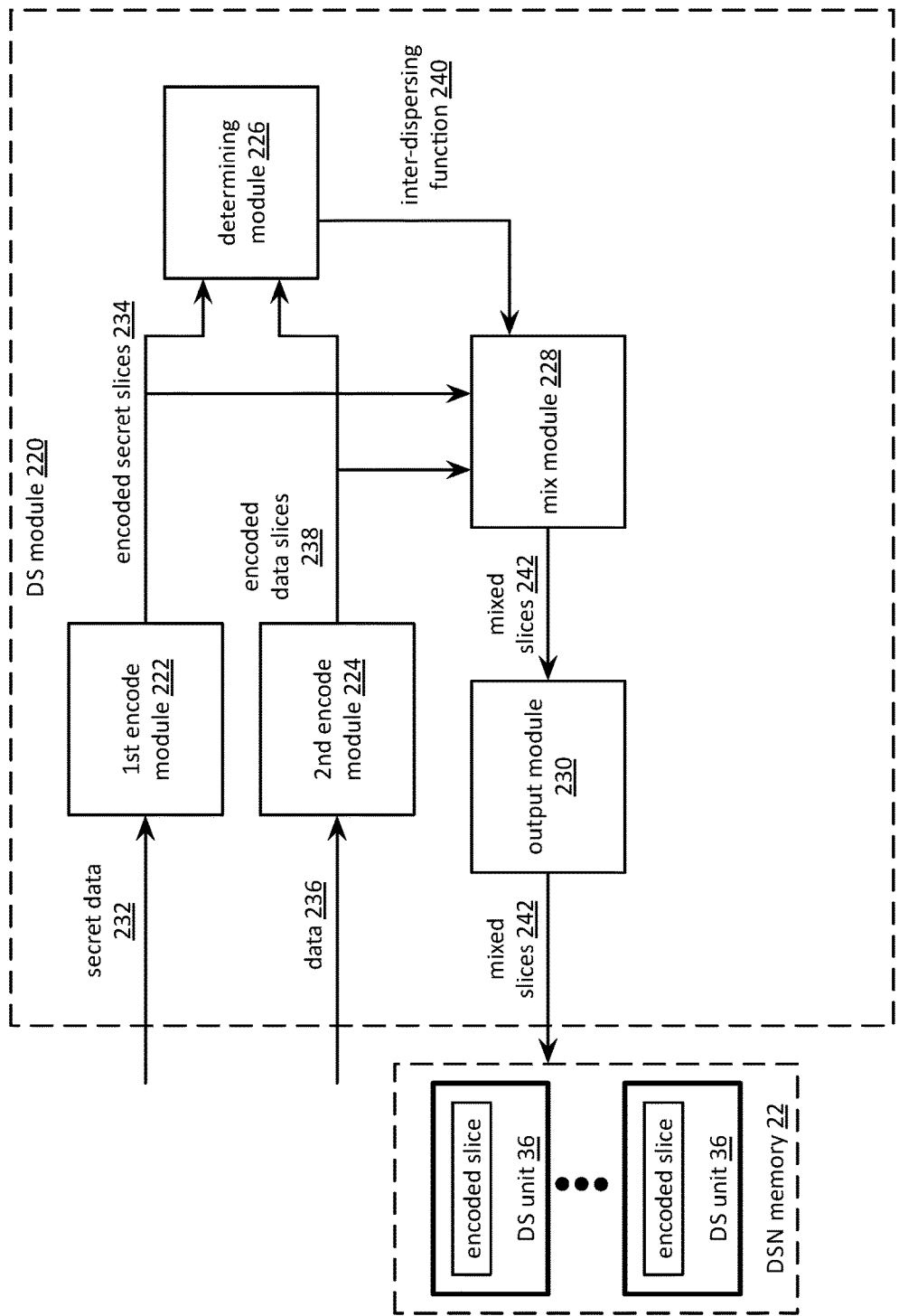
FIG. 12B is a block diagram illustrating an example of an obfuscation module in accordance with the invention.

FIG. 12B is a block diagram of a DS module (of a DS processing unit, of a user device, of a storage integrity processing unit, of a DS management unit, etc.) that is operable to obfuscation data in accordance with the method described in FIG. 12A. The DS module 220 includes a first encode module 222, a second encode module 224, a determining module 226, a mix module 228, and an output module 230. The modules 222-230 may be separate modules, sub-modules of another module, and/or a combination thereof.

The first encode module 222 dispersed storage error encodes secret data 232 in accordance with first dispersed storage error encoding parameters to produce at least one set of encoded secret slices 234. The second encode module 224 dispersed storage error encodes data 236 in accordance with second dispersed storage error encoding parameters to produce a plurality of sets of encoded data slices 238.

The determining module 226 determines an inter-dispersing function 240 for outputting the sets of encoded secret slices 234 and the plurality of sets of encoded data slices 238. For a set of the plurality of encoded data slices 238, the mix module 228 identifies at least one encoded data slice of the set of encoded data slices 238 based on the inter-dispersing function 240 and replaces the at least one encoded data slice with at least one encoded secret slice of the at least one set of encoded secret slices 234 to produce a mixed set of encoded slices 242. The replacing the at least one encoded data slice with the at least one encoded secret slice includes generating a slice name for an encoded data slice of the at least one encoded data slice and assigning the slice name to an encoded secret slice of the at least one encoded secret slice.

The output module 230 facilitates outputting the mixed set of encoded slices 242. The outputting includes updating a directory regarding a set of slice names corresponding to the mixed set of encoded slices 242. Alternatively, or in addition to, the outputting the mixed set of encoded slices 242 includes outputting the encoded secret slice using the slice name of the encoded data slice. For example, the output module 230 facilitates sending a plurality of mixed sets of encoded slices to a dispersed storage network (DSN) memory 22 for storage therein utilizing a plurality of sets of slice names corresponding to the plurality of sets of encoded data slices 238. As another example, the output module 230 facilitates communicating the plurality of mixed sets of encoded slices via a communication network (e.g., send to a computer, send to a communication device over a wireless communications path).

The determining module 226 and the mix module 228 operate in accordance with the inter-dispersing function. For example, when the inter-dispersing function 240 is a horizontal approach the determining module 226 determines the inter-dispersing function by identifying a first decode threshold and a first pillar width based on the first dispersed storage error encoding parameters; and identifying a second decode threshold and a second pillar width based on the second dispersed storage error encoding parameters, wherein the first decode threshold is less than or equal to a difference between the second pillar width and the second decode threshold. The mix module 228 identifies the at least one encoded data slice by identifying a number of encoded data slices of the set of encoded data slices 238 as the at least one encoded data slice to be at least equal to the first decode threshold. The mix module 228 replaces the at least one encoded data slice by replacing the number of encoded data slices with at least a first decode threshold number of encoded secret slices of a set of the least one set of encoded secret slices 234.

As another example, when the inter-dispersing function 240 is a vertical approach, at step 204, the determining module 226 determines the inter-dispersing function 240 by identifying a first decode threshold and a first pillar width based on the first dispersed storage error encoding parameters. For the set of the plurality of encoded data slices, the mix module 228 identifies the at least one encoded data slice by identifying a number of encoded data slices of the set of encoded data slices as the at least one encoded data slice to be less than the first decode threshold. The mix module 228 replaces the at least one encoded data slice by replacing the number of encoded data slices with less than a first decode threshold number of encoded secret slices of a set of the least one set of encoded secret slices 234. For a second set of the plurality of encoded data slices, the mix module 228 identifies a second number of encoded data slices of the second set of encoded data slices to be less than the first decode threshold. The mix module 228 replaces the second number of encoded data slices with at least one other encoded secret slice of the set of the least one set of encoded secret slices.

Figure 13A:
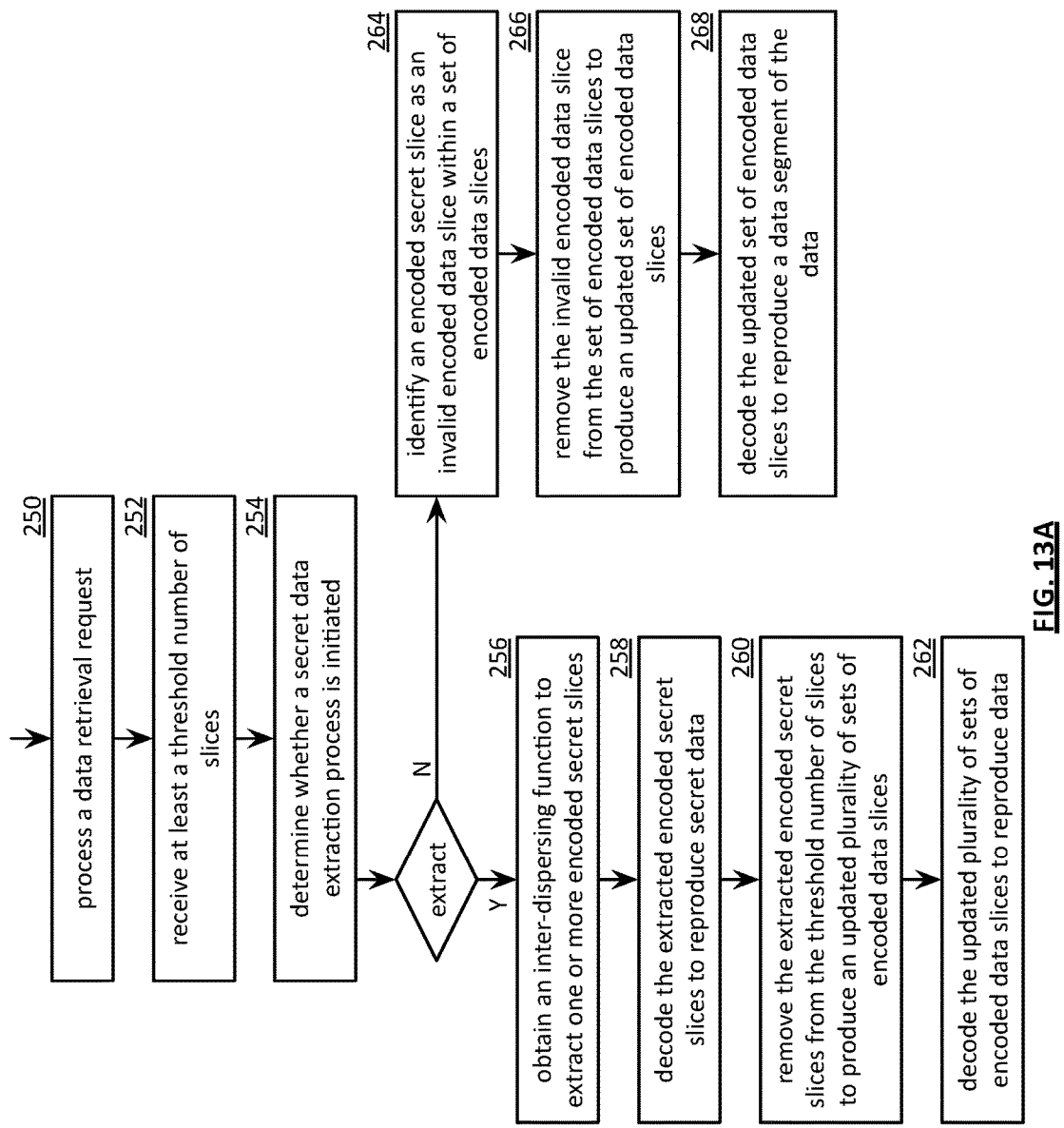
FIG. 13A is a flowchart illustrating an example of recovering hidden data in accordance with the invention.

FIG. 13A is a flowchart illustrating an example of recovering hidden data. The method begins at step 250 where a processing module (e.g., of a dispersed storage (DS) processing unit) processes a data retrieval request that identifies data, wherein the data is stored in dispersed storage memory as a plurality of sets of encoded data slices, wherein one or more encoded data slices of the plurality of sets of encoded data slices has been replaced with one or more encoded secret slices, and wherein the one or more encoded secret data slices represents secret data. The retrieval request may include one or more of a secret data identifier (ID), an associated data ID, a secret data dispersed storage network (DSN) address, an associated data DSN address, a vault ID, a user ID, a user device ID, a file name, a block ID, a source name, a vault source name, a slice name, watermarking information, and a secret segment ID. The processing the data retrieval request includes accessing a directory regarding a plurality of sets of slice names corresponding to the plurality of sets of encoded data slices and generating a plurality of sets of slice retrieval requests based on the plurality of sets of slice names.

The method continues at step 252 where the processing module receives, in response to the processing the data retrieval request, at least a threshold number of the plurality of sets of encoded data slices. The threshold number of the plurality of sets of encoded data slices includes one or more of at least a decode threshold number of encoded data slices per set of encoded data slices of the plurality of sets of encoded data slices and at least a secret decode threshold number of encoded secret slices per set of encoded secret slices of a plurality of sets of encoded secret slices.

The method continues at step 254 where the processing module determines whether a secret data extraction process is initiated. The determining whether the secret data extraction process is initiated includes at least one the data retrieval request further including a request to initiate the secret data extraction process; receiving a secret data extraction request to initiate the secret data extraction process; and interpreting the plurality of sets of encoded data slices to identify a pattern of invalid encoded data slices, interpreting the pattern of invalid encoded data slices as a secret data pattern, and initiating the secret data extraction process when the secret data pattern is valid. The method branches to step 264 when the processing module determines that the secret data extraction process is not initiated. The method continues to step 256 when the processing module determines that the secret data extraction process is initiated.

The method continues at step 256 where a processing module obtains an inter-dispersing function to extract the one or more encoded secret slices from the plurality of sets of encoded data slices to produce extracted encoded secret slices. The obtaining the inter-dispersing function includes one of obtaining a horizontal dispersing function and obtaining a vertical dispersing function. The extracting includes identifying at least the secret decode threshold number of encoded secret slices of the one or more encoded secret slices within a set of the plurality of sets of encoded data slices based on the horizontal dispersing function when obtaining the horizontal dispersing function and identifying less than a secret decode threshold number of encoded secret slices of the one or more encoded secret slices within a set of the plurality of sets of encoded data slices based on the vertical dispersing function when obtaining the vertical dispersing function.

The method continues at step 258 where the processing module decodes the extracted encoded secret slices in accordance with secret dispersed storage error encoding parameters to reproduce the secret data. The method continues at step 260 where the processing module removes the extracted encoded secret slices from the plurality of sets of encoded data slices to produce an updated plurality of sets of encoded data slices. The method continues at step 262 where the processing module decodes the updated plurality of sets of encoded data slices in accordance with dispersed storage error encoding parameters to reproduce the data.

The method continues at step 264 where the processing module identifies an encoded secret slice of the one or more encoded secret slices as an invalid encoded data slice within a set of encoded data slices of the plurality of sets of encoded data slices when the secret data extraction process is not initiated. The identifying includes at least one of receiving a command, receiving a list of encoded secret slices, and performing an iterative decoding process on a decode threshold number of encoded data slices of the set of encoded data slices (e.g., identifying the invalid encoded data slice of based on an iterative decoding process result).

The method continues at step 266 where the processing module removes the invalid encoded data slice from the set of encoded data slices to produce an updated set of encoded data slices. The method continues at step 268 where the processing module decodes the updated set of encoded data slices in accordance with dispersed storage error encoding parameters to reproduce a data segment of the data. The method may continue to produce a plurality of data segments corresponding to the plurality of sets of encoded data slices to reproduce the data.

Figure 13B:
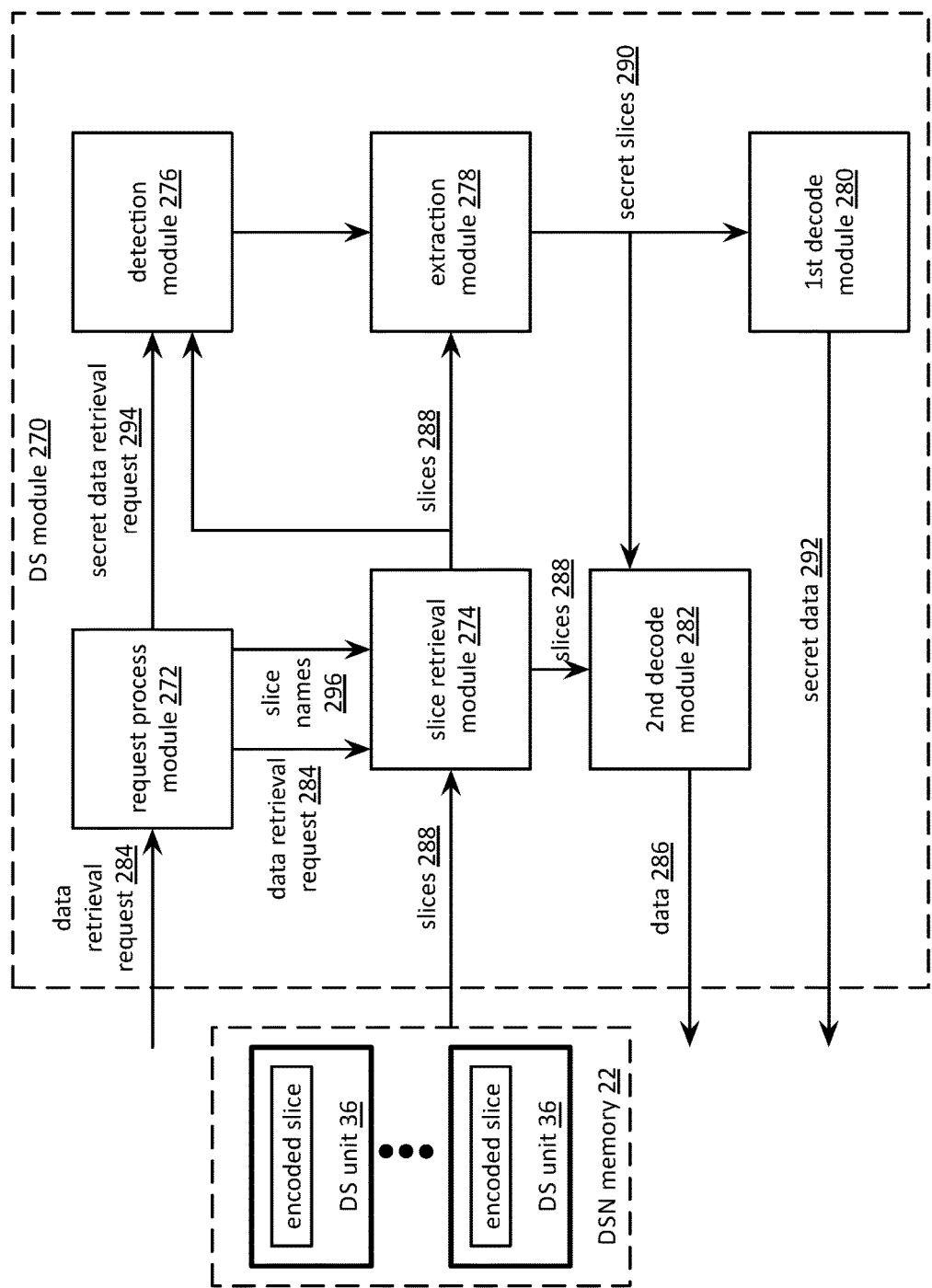
FIG. 13B is a block diagram illustrating an example of a de-obfuscation module in accordance with the invention.

FIG. 13B is a block diagram illustrating an example of DS module (of a DS processing unit, of a user device, of a storage integrity processing unit, of a DS management unit, etc.) that is operable to a de-obfuscation data in accordance with the method described in FIG. 13A. The DS module 270 includes a request process module 272, a slice retrieval module 274, a detection module 276, an extraction module 278, a first decode module 280, and a second decode module 282. The modules 272-282 may be separate modules, submodules of another module, and/or a combination thereof.

The request process module 272 processes a data retrieval request 284 that identifies data 286, wherein the data 286 is stored in dispersed storage network memory 22 as a plurality of sets of encoded data slices 288, wherein one or more encoded data slices of the plurality of sets of encoded data slices 288 has been replaced with one or more encoded secret slices 290, and wherein the one or more encoded secret data slices represents secret data 292. The request process module 272 functions to process the data retrieval request 284 by accessing a directory regarding a plurality of sets of slice names 296 corresponding to the plurality of sets of encoded data slices 288 and generating a plurality of sets of slice retrieval requests based on the plurality of sets of slice names 296.

The slice retrieval module 274 facilitates receiving, in response to the processing the data retrieval request 284, at least a threshold number of the plurality of sets of encoded data slices 288. The threshold number of the plurality of sets of encoded data slices includes one or more of at least a decode threshold number of encoded data slices per set of encoded data slices of the plurality of sets of encoded data slices and at least a secret decode threshold number of encoded secret slices per set of encoded secret slices of a plurality of sets of encoded secret slices.

The detection module 276 determines whether a secret data extraction process is initiated. The detection module 276 functions to determine whether the secret data extraction process is initiated by at least one the data retrieval request 284 further by a request to initiate the secret data extraction process; receiving a secret data extraction request 294 to initiate the secret data extraction process; and interpreting the plurality of sets of encoded data slices 288 to identify a pattern of invalid encoded data slices, interpreting the pattern of invalid encoded data slices as a secret data pattern, and initiating the secret data extraction process when the secret data pattern is valid.

The extraction module 278, when the secret data extraction process is initiated, obtains an inter-dispersing function to extract the one or more encoded secret slices 290 from the plurality of sets of encoded data slices 288 to produce extracted encoded secret slices 290. The extract secret slices module 278 further functions to obtain the inter-dispersing function by obtaining a horizontal dispersing function and identifying at least a secret decode threshold number of encoded secret slices of the one or more encoded secret slices within a set of the plurality of sets of encoded data slices 288 based on the horizontal dispersing function. Alternatively, or in addition to, the extraction module 278 further functions to obtain the inter-dispersing function by obtaining a vertical dispersing function and identifying less than a secret decode threshold number of encoded secret slices of the one or more encoded secret slices within a set of the plurality of sets of encoded data slices 288 based on the vertical dispersing function.

The first decode module 280 decodes the extracted encoded secret slices 290 in accordance with secret dispersed storage error encoding parameters to reproduce the secret data 292. The second decode module 282 functions to, when the secret data extraction process is not initiated and for a set of the plurality of sets of encoded data slices 288, identify an encoded secret slice of the one or more encoded secret slices 290 as an invalid encoded data slice within the set of encoded data slices, remove the invalid encoded data slice from the set of encoded data slices to produce an updated set of encoded data slices, and decode the updated set of encoded data slices in accordance with dispersed storage error encoding parameters to reproduce a data segment of the data 286. Alternatively, or addition to, the second decode module 282 functions to, when the secret data extraction process is initiated, remove the extracted encoded secret slices 290 from the plurality of sets of encoded data slices 288 to produce an updated plurality of sets of encoded data slices and decode the updated plurality of sets of encoded data slices in accordance with dispersed storage error encoding parameters to reproduce the data 286.

Figure 14A:
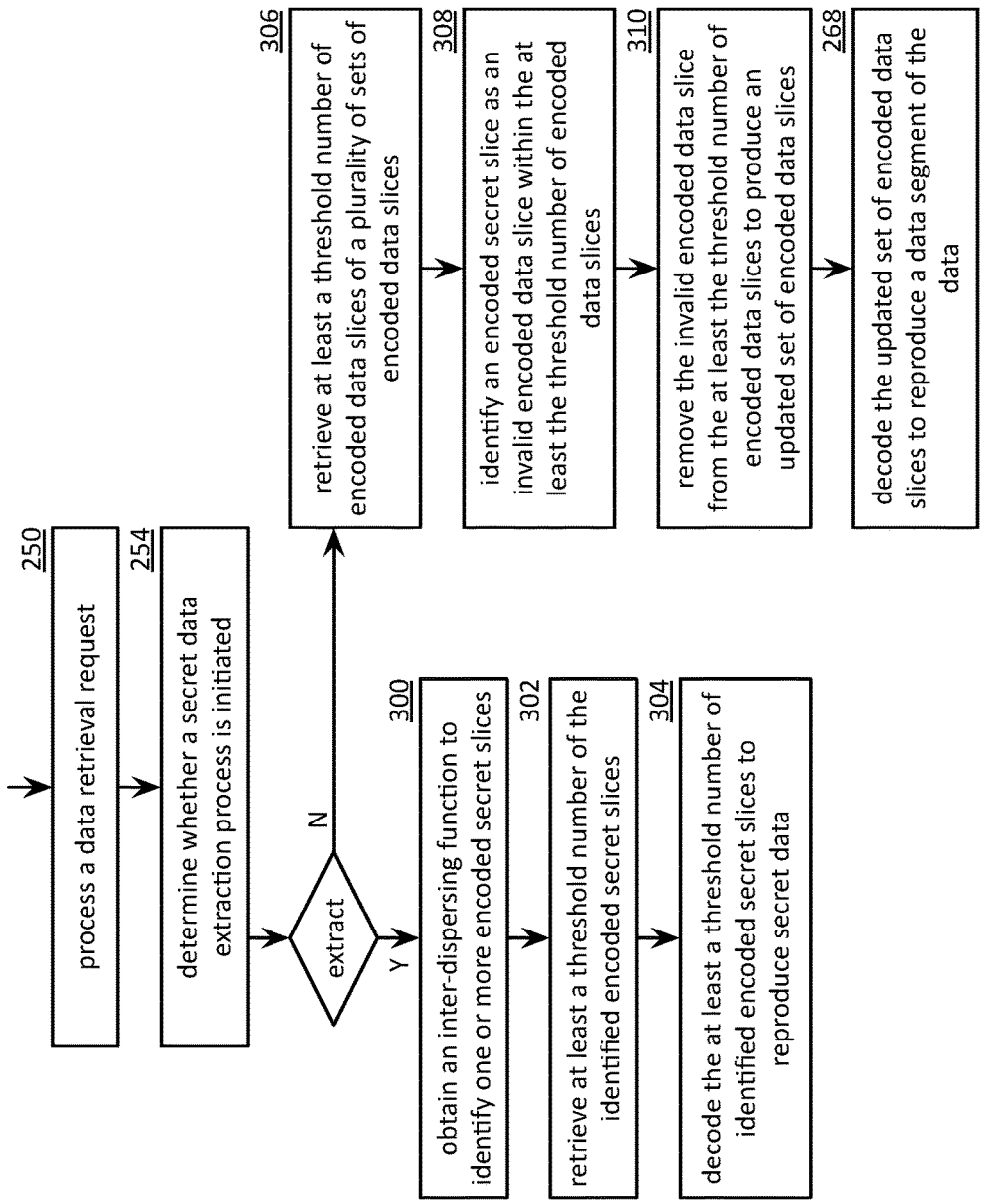
FIG. 14A is a flowchart illustrating another example of recovering hidden data in accordance with the invention.

FIG. 14A is a flowchart illustrating another example of recovering hidden data, which include similar steps to FIG. 13A. The method begins with step 250 of FIG. 13A where a processing module (e.g., of a dispersed storage (DS) processing unit) processes a data retrieval request that identifies data, wherein the data is stored in dispersed storage memory as a plurality of sets of encoded data slices, wherein one or more encoded data slices of the plurality of sets of encoded data slices has been replaced with one or more encoded secret slices, and wherein the one or more encoded secret data slices represents secret data. The method continues with step 254 of FIG. 13A where the processing module determines whether a secret data extraction process is initiated. The method branches to step 306 when the processing module determines that the secret data extraction process is not initiated. The method continues to step 300 the processing module determines that the secret data extraction process is initiated.

The method continues at step 300 where the processing module obtains an inter-dispersing function to identify the one or more encoded secret slices from the plurality of sets of encoded data slices to produce identified encoded secret slices when the secret data extraction process is initiated. The method continues at step 302 where the processing module retrieves at least a threshold number of the identified encoded secret slices. The retrieving may be based on slice names of a plurality of sets of slices names corresponding to the one or more encoded secret slices. The method continues at step 304 where the processing module decodes the at least a threshold number of the identified encoded secret slices in accordance with secret dispersed storage error encoding parameters to reproduce the secret data.

The method continues at step 306 where the processing module receives at least a threshold number of the encoded data slices of the set of encoded data slices when the secret data extraction process is not initiated and for a set of the plurality of sets of encoded data slices. The method continues at step 308 where the processing module identifies an encoded secret slice of the one or more encoded secret slices as an invalid encoded data slice within the at least the threshold number of the encoded data slices. The identifying includes at least one of receiving a command, receiving a list of encoded secret slices, and performing an iterative decoding process on a decode threshold number of encoded data slices of the set of encoded data slices (e.g., identifying the invalid encoded data slice of based on an iterative decoding process result).

The method continues at step 310 where the processing module removes the invalid encoded data slice from the at least the threshold number of the encoded data slices to produce an updated set of encoded data slices. The method continues with step 268 of FIG. 13A where the processing module decodes the updated set of encoded data slices in accordance with dispersed storage error encoding parameters to reproduce a data segment of the data.

Figure 14B:
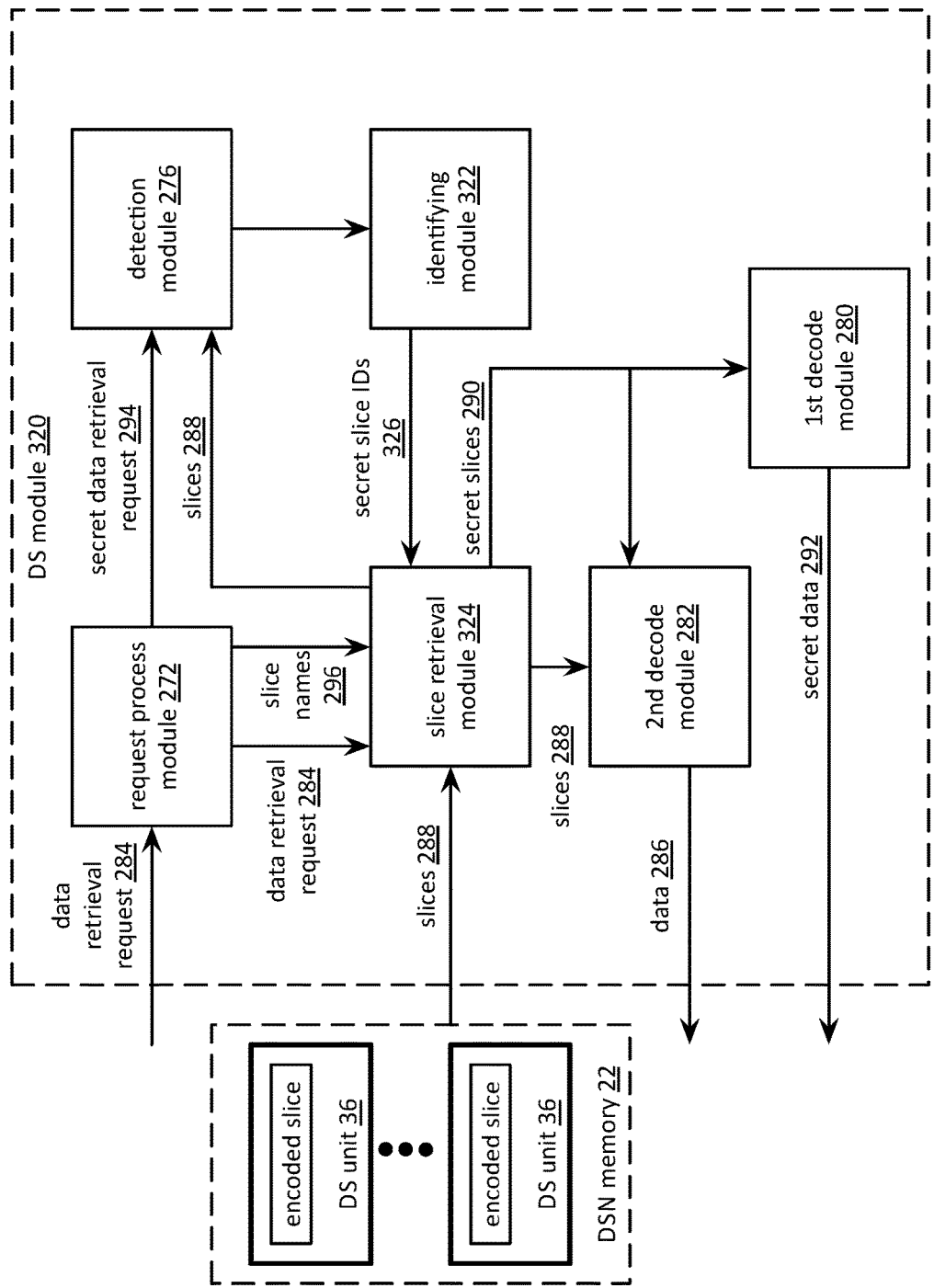
FIG. 14B is a block diagram illustrating another example of a de-obfuscation module in accordance with the invention.

FIG. 14B is a block diagram illustrating another example of DS module (of a DS processing unit, of a user device, of a storage integrity processing unit, of a DS management unit, etc.) that is operable to de-obfuscation data in accordance with the method described in FIG. 14A. The DS module 320 includes a request process module 272, a slice retrieval module 324, a detection module 276, an identifying module 322, a first decode module 280, and a second decode module 282. The modules 272, 276, 280, 282, 322, and 324 may be separate modules, sub-modules of another module, and/or a combination thereof.

The request process module 272 of FIG. 13B processes a data retrieval request 284 that identifies data 286, wherein the data 286 is stored in a dispersed storage network memory 22 as a plurality of sets of encoded data slices 288, wherein one or more encoded data slices of the plurality of sets of encoded data slices 288 has been replaced with one or more encoded secret slices 290, and wherein the one or more encoded secret data slices 290 represents secret data 292. The detection module 276 determines whether a secret data extraction process is initiated.

The identifying module 322, when the secret data extraction process is initiated, obtains an inter-dispersing function to identify the one or more encoded secret slices 290 from the plurality of sets of encoded data slices 288 to produce identified encoded secret slices 326 (e.g., secret slice identifiers (IDs)). The slice retrieval module 324 retrieves at least a threshold number of the identified encoded secret slices (e.g., a secret decode threshold number of encoded secret slices per set of a plurality of sets of encoded secret slices). The slice retrieval module 324 further functions to retrieve the at least the threshold number of the identified encoded secret slices based on slice names of the plurality of sets of slices names 296 corresponding to the one or more encoded secret slices 290.

The first decode module 280 decodes the at least a threshold number of the identified encoded secret slices 290 in accordance with secret dispersed storage error encoding parameters to reproduce the secret data 292. The second decode module 282 functions to, when the secret data extraction process is not initiated and for a set of the plurality of sets of encoded data slices, receiving at least a threshold number of the encoded data slices of the set of encoded data slices (e.g., a decode threshold number of encoded data slices per set), identifying an encoded secret slice of the one or more encoded secret slices as an invalid encoded data slice within the at least the threshold number of the encoded data slices, removing the invalid encoded data slice from the at least the threshold number of the encoded data slices to produce an updated set of encoded data slices, and decoding the updated set of encoded data slices in accordance with dispersed storage error encoding parameters to reproduce a data segment of the data 286.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device in a dispersed storage network (DSN), the method comprises:
first encoding first data into a first plurality of sets of encoded data slices, wherein the first encoding is in accordance with a first dispersed error encoding function such that, for a set of encoded data slices of the first plurality of sets of encoded data slices, a first decode threshold number of encoded data slices is required to recover a corresponding first data segment of the first data;
second encoding second data into a second plurality of sets of encoded data slices, wherein the second encoding is in accordance with a second dispersed error encoding function such that, for a set of encoded data slices of the second plurality of sets of encoded data slices, a second decode threshold number of encoded data slices is required to recover a corresponding second data segment of the first data, wherein the second data segment is different from the first data segment;
creating a plurality of mixed sets of encoded data slices from the first and second plurality of sets of encoded data slices in accordance with a mixing pattern; and
outputting the plurality of sets of mixed encoded data slices to storage units of the DSN for storage therein.

2. The method of claim 1 further comprises:
the first data including one or more of: a file, a data object, a data block, and a directory; and
the second data including secret data.

3. The method of claim 1 further comprises:
the first data including one or more of: a file, a data object, a data block, and a directory; and
the second data including watermarking data.

4. The method of claim 1 further comprises:
the first dispersed error encoding function being substantially identical to the second dispersed error encoding function.

5. The method of claim 1 further comprises:
storing at least a representation of the mixing pattern.

6. The method of claim 5, wherein the at least a representation of the mixing pattern comprises:
a data extraction process.

7. The method of claim 1 further comprises:
retrieving the plurality of sets of mixed encoded data slices;
interpreting, based on the first plurality of sets of encoded data slices, the plurality of sets of mixed encoded data slices to identify a pattern of invalid encoded data slices;
interpreting the pattern of invalid encoded data slices as the mixed pattern; and
initiating a second data extraction process in accordance with the mixed pattern.

8. A computing device for use in a dispersed storage network (DSN), the computing devices comprises:
an interface;
memory; and
a processing module operably coupled to the memory and the interface, wherein the processing module is operable to:
first encode first data into a first plurality of sets of encoded data slices, wherein the first encoding is in accordance with a first dispersed error encoding function such that, for a set of encoded data slices of the first plurality of sets of encoded data slices, a first decode threshold number of encoded data slices is required to recover a corresponding first data segment of the first data;

second encode second data into a second plurality of sets of encoded data slices, wherein the second encoding is in accordance with a second dispersed error encoding function such that, for a set of encoded data slices of the second plurality of sets of encoded data slices, a second decode threshold number of encoded data slices is required to recover a corresponding second data segment of the first data, wherein the second data segment is different from the first data segment;

create a plurality of mixed sets of encoded data slices from the first and second plurality of sets of encoded data slices in accordance with a mixing pattern; and output, via the interface, the plurality of sets of mixed encoded data slices to storage units of the DSN for storage therein.

9. The computing device of claim 8 further comprises:
the first data including one or more of: a file, a data object, a data block, and a directory; and
the second data including secret data.

10. The computing device of claim 8 further comprises:
the first data including one or more of: a file, a data object, a data block, and a directory; and
the second data including watermarking data.

11. The computing device of claim 8 further comprises:
the first dispersed error encoding function being substantially identical to the second dispersed error encoding function.

12. The computing device of claim 8, wherein the processing module is further operable to:
output, via the interface, at least a representation of the mixing pattern for storage.

13. The computing device of claim 12, wherein the at least a representation of the mixing pattern comprises:
a data extraction process.

14. The computing device of claim 8, wherein the processing module is further operable to:
retrieve the plurality of sets of mixed encoded data slices;
interpret, based on the first plurality of sets of encoded data slices, the plurality of sets of mixed encoded data slices to identify a pattern of invalid encoded data slices;
interpret the pattern of invalid encoded data slices as the mixed pattern; and
initiate a second data extraction process in accordance with the mixed pattern.

15. A computer readable storage device comprises:
a first memory section for storing operational instructions that, when executed by a computing device, causes the computing device to:
first encode first data into a first plurality of sets of encoded data slices, wherein the first encoding is in accordance with a first dispersed error encoding function such that, for a set of encoded data slices of the first plurality of sets of encoded data slices, a first decode threshold number of encoded data slices is required to recover a corresponding first data segment of the first data; and
second encode second data into a second plurality of sets of encoded data slices, wherein the second encoding is in accordance with a second dispersed error encoding function such that, for a set of encoded data slices of the second plurality of sets of encoded data slices, a second decode threshold number of encoded data slices is required to recover a corresponding second data segment of the first data, wherein the second data segment is different from the first data segment;

a second memory section for storing operational instructions that, when executed by the computing device, causes the computing device to:
create a plurality of mixed sets of encoded data slices from the first and second plurality of sets of encoded data slices in accordance with a mixing pattern; and a third memory section for storing operational instructions that, when executed by the computing device, causes the computing device to:
output the plurality of sets of mixed encoded data slices to storage units of a dispersed storage network (DSN) for storage therein.

16. The computer readable storage device of claim 15 further comprises:
the first data including one or more of: a file, a data object, a data block, and a directory; and
the second data including at least one of secret data and watermarking data.

17. The computer readable storage device of claim 15 further comprises:
the first dispersed error encoding function being substantially identical to the second dispersed error encoding function.

18. The computer readable storage device of claim 15, wherein the third memory section further stores operational instructions that, when executed by the computing device, causes the computing device to:
output at least a representation of the mixing pattern for storage.

19. The computer readable storage device of claim 18, wherein the at least a representation of the mixing pattern comprises:
a data extraction process.

20. The computer readable storage device of claim 15 further comprises:
a fourth memory section for storing operational instructions that, when executed by the computing device or another computing device, causes the computing device or the other computing device to:
retrieve the plurality of sets of mixed encoded data slices;
interpret, based on the first plurality of sets of encoded data slices, the plurality of sets of mixed encoded data slices to identify a pattern of invalid encoded data slices;
interpret the pattern of invalid encoded data slices as the mixed pattern; and
initiate a second data extraction process in accordance with the mixed pattern.

* * * * *